US012041147B2

(12) United States Patent
Banerjee et al.

(10) Patent No.: US 12,041,147 B2
(45) Date of Patent: Jul. 16, 2024

(54) ALLOCATION OF FOG NODE RESOURCES

(71) Applicant: Telefonaktiebolaget LM Ericsson (publ), Stockholm (SE)

(72) Inventors: Arindam Banerjee, Howrah (IN); M Saravanan, Chennai (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/616,976

(22) PCT Filed: Jun. 7, 2019

(86) PCT No.: PCT/IN2019/050436
§ 371 (c)(1),
(2) Date: Dec. 6, 2021

(87) PCT Pub. No.: WO2020/245835
PCT Pub. Date: Dec. 10, 2020

(65) Prior Publication Data
US 2022/0166848 A1  May 26, 2022

(51) Int. Cl.
G06F 15/173 (2006.01)
H04L 67/10 (2022.01)
(Continued)

(52) U.S. Cl.
CPC .............. H04L 67/60 (2022.05); H04L 67/10 (2013.01); H04L 67/52 (2022.05)

(58) Field of Classification Search
USPC ....................................................... 709/226
See application file for complete search history.

(56) References Cited

U.S. PATENT DOCUMENTS 11,119,825 B2 * 9/2021 Jalali ...................... H04L 45/00
11,140,096 B2 * 10/2021 Hanes ................ H04L 43/0817
(Continued)

FOREIGN PATENT DOCUMENTS

CN    101502140 A      8/2009
CN    108886670 A      11/2018
CN    108112037 B  *  6/2021    ............ H04W 28/08

OTHER PUBLICATIONS

Extended European Search Report mailed Nov. 22, 2022 for European Patent Application No. 19931825.4, 10 pages.
(Continued)

Primary Examiner — Yves Dalencourt
(74) Attorney, Agent, or Firm — Sonoda & Kobayashi Intellectual Property Law; Sarvajit S. Patil

(57) ABSTRACT

A method for allocating resources of fog nodes is disclosed, wherein the fog nodes are organized into at least one fog network. The method includes receiving a request from a client node, identifying requirements for fulfillment of the request, determining a location of the client node for fulfillment of the request, and identifying, from the identified requirements and the determined location, a cluster of fog nodes operable to fulfill the request. The method further includes selecting, from the identified cluster, fog nodes the resources of which are to be allocated to fulfilling the request by minimizing at least one of a number of clusters required to fulfill the request, a total time to fulfill requests received by the fog nodes, and/or a number of unfulfilled requests received by the fog nodes.

15 Claims, 12 Drawing Sheets

(51) Int. Cl.
*H04L 67/52* (2022.01)
*H04L 67/60* (2022.01)

(56) References Cited

U.S. PATENT DOCUMENTS

| | | | | |
|---|---|---|---|---|
| 2003/0126200 | A1* | 7/2003 | Wolff | G06F 9/52 |
| | | | | 709/218 |
| 2013/0262556 | A1* | 10/2013 | Xu | G06F 9/5072 |
| | | | | 709/202 |
| 2014/0244848 | A1 | 8/2014 | Lynch | |
| 2016/0054135 | A1* | 2/2016 | Fowe | G01C 21/34 |
| | | | | 701/411 |
| 2017/0048308 | A1* | 2/2017 | Qaisar | H04L 41/0895 |
| 2017/0366472 | A1* | 12/2017 | Byers | H04L 67/289 |
| 2018/0109428 | A1* | 4/2018 | Kattepur | H04W 4/70 |
| 2019/0158417 | A1* | 5/2019 | Aronovich | H04L 43/0817 |
| 2019/0158606 | A1* | 5/2019 | Guim Bernat | H04W 4/40 |
| 2019/0222518 | A1* | 7/2019 | Bernat | H04L 43/08 |
| 2020/0204463 | A1* | 6/2020 | Guan | G06F 16/27 |

OTHER PUBLICATIONS

Office Action mailed Sep. 6, 2023 for Chinese Application No. 201980097181.5, 11 pages.
International Search Report and Written Opinion of the International Searching Authority, PCT/IN2019/050436, mailed Aug. 30, 2019, 13 pages.
Santos, José et al., "Resource Provisioning in Fog Computing: From Theory to Practice," Sensors, 2019, 19, 25 pages.
Qayyum, Tariq et al., "FogNetSim++: A Toolkit for Modeling and Simulation of Distributed Fog Environment," Digital Object Identifier, 2018, 10, 14 pages.
Nguyen, Chanh et al., "Multivariate LSTM-based Location-aware Workload Prediction for Edge Data Centers," 2019 19th IEEE/ACM International Symposium on Cluster, Cloud and Grid Computing (CCGRID), Larnaca, Cyprus, May 17, 2019, 10 pages.
González, Marta C. et al. "Understanding individual human mobility patterns," Nature, 2008, 453, 12 pages.
Song, Chaoming et al., "Limits of Predictability in Human Mobility," Science, Feb. 19, 2010, vol. 327, 4 pages.

* cited by examiner

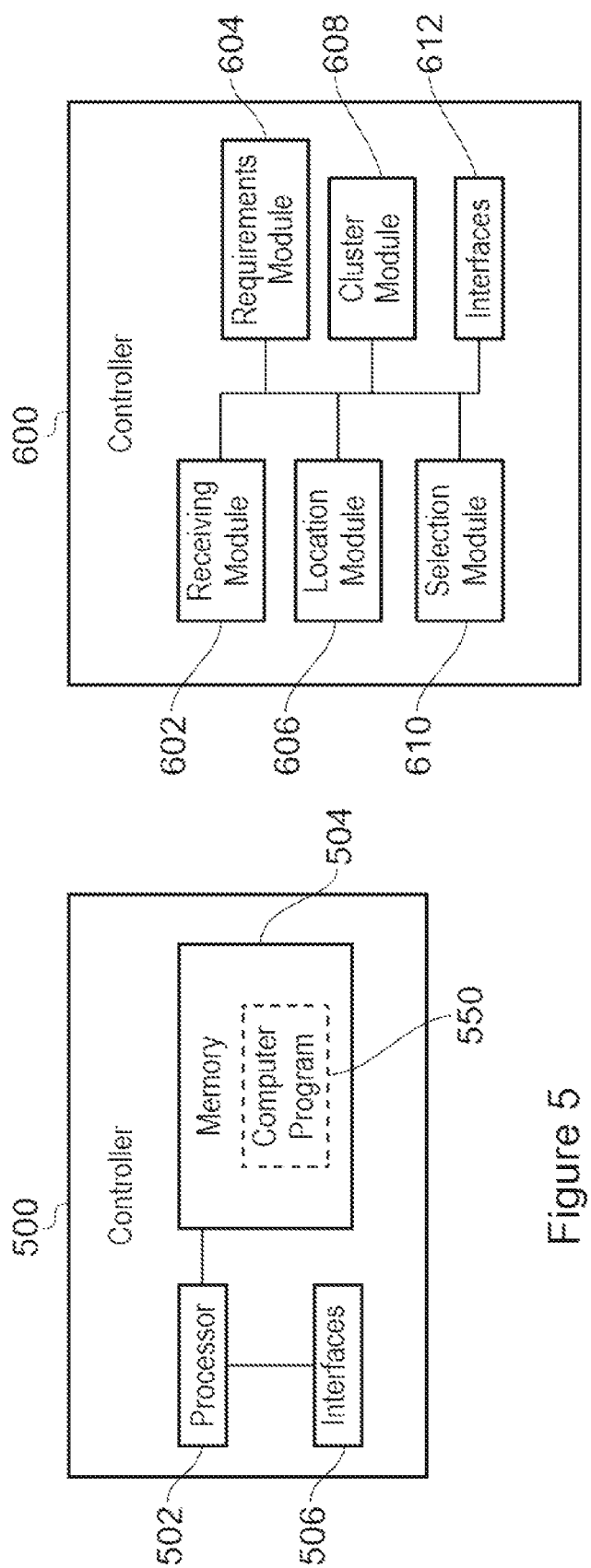

ALLOCATION OF FOG NODE RESOURCES

CROSS REFERENCE TO RELATED APPLICATIONS

This application is a 35 U.S.C. § 371 national stage application of PCT International Application No. PCT/IN2019/050436 filed on Jun. 7, 2019, the disclosure and content of which is incorporated by reference herein in its entirety.

TECHNICAL FIELD

The present disclosure relates to a method for allocating resources of fog nodes, wherein the fog nodes are organized into at least one fog network. The present disclosure also relates to a controller and to a computer program and a computer program product configured, when run on a computer to carry out a method for allocating resources of fog nodes.

BACKGROUND

Fog computing refers to the extension of Cloud computing to the edge of a network, facilitating the operation of compute, storage, and networking services between end devices and cloud computing data centers. Fog computing may thus be considered as a complement to cloud computing, and is predicted to benefit varying domains including mobile/wearable computing, Internet of Things (IoT), and big data analytics. Some of the advantages afforded by fog computing include reducing latency, increasing throughput, consolidating resources, saving energy, and enhancing security and privacy. For example, in big data analytics, huge volumes of data are generated at the edge of network. Fog computing supports edge analytics, which can reduce the delay of big data analytics and decrease the cost of data transmission and storage.

Fog computing is likely to be a key component in developing the smart city paradigm, which envisages the use of Information and Communication Technologies (ICT), to develop, deploy and promote sustainable development practices in order to address growing urbanisation challenges. Central to this ICT framework is an intelligent network of connected objects and machines that transmit data using wireless technology and the cloud. Cloud-based IoT applications receive, analyse and manage data in real time to help municipalities, enterprises and citizens make improved decisions. Traditional cloud computing architectures cannot meet the requirements of a massive IoT deployment on this scale, and Fog computing is therefore envisaged to address issues including latency, protection of network bandwidth, security concerns and reliability of operations, adaptation to different environmental conditions and the ability to both store data and take decisions closer to a relevant location. In some situations, the ability to analyse data close to the device that collected the data can make the difference between addressing an issue in time and a cascading system failure. The increasing cost of transport and speed of processing are also driving the adoption of fog computing, in which computing power is distributed across the edge network, data centers, and the public cloud. Fog computing is starting to be rolled out in smart cities, connected cars, drones and other applications. Key challenges in running IoT applications in a Fog computing environment are resource allocation and task scheduling. Fog computing research is still in its infancy, and taxonomy-based investigation into the requirements of Fog infrastructure, platform, and applications mapped to current research is still required.

It will be appreciated that analysing IoT sensor data close to where it is collected has the advantages of minimizing latency, offloading significant amounts of network traffic form the core network and maintaining potentially sensitive data within the network in which it was generated. Resources are most dynamic and heterogeneous in a Fog environment because of the diversity of IoT devices and their available resources. All devices known as Fog devices are responsible for performing the computation of their own application. Fog computing aims to use idle resources available on any Fog device, with Fog computation always taking second priority to the device's own application. In general, the amount of resources available for Fog computation is dynamic but predictable through analysis of long-term activity of Fog node resources. This prediction is useful because during execution of a Fog task, the status of resources of the Fog node carrying out the task may change, owing for example to receipt of a request from an application for which the Fog node is responsible. This differs from a Cloud situation, in which it is possible to know what resources are currently available and whether or not they are exclusively used for cloud-based application requests. Resource allocation and scheduling as a part of dynamic collaboration within Fog nodes are consequently considerably more challenging than resource allocation and scheduling in the cloud.

Important characteristics of Fog computing such as low latency and location awareness, wide-spread geographical distribution, mobility, multiple nodes in close proximity, predominant role of wireless access, significant presence of streaming and real-time applications and heterogeneity. An example use case embodying some of these characteristic is a smart city situation involving four fog networks—smart building, smart transport, connected cars and smart parking. These networks are available in a smart city environment illustrated in FIG. 1. Resource allocation involves the selection and connection of different fog nodes from different networks and use of their knowledge and resources to perform tasks. Such tasks might include deciding where to park for an appointment by considering various factors including traffic, available parking lot, building and floor of appointment, etc.

Fog computing architecture is a hierarchical architecture in which data from lower layers cascades to upper layers and finally to the top most cloud layer, as illustrated in FIG. 2. Data transmission is possible in both North-South and East-West directions. There can be multiple clouds present in a smart city paradigm, which clouds may be connected to unique or common fog nodes to collect data for different purposes. Fog nodes are connected to IoT devices including sensors, actuators etc. IoT devices and Fog nodes developed by different manufacturers may be present in a Fog network, and no standard annotation is provided for data collected by them. Variations in syntax, labelling and operation between Fog nodes supplied by different Vendors can additionally complicate the task of allocation of resources in the network.

SUMMARY

It is an aim of the present disclosure to provide a method, apparatus and computer readable medium which at least partially address one or more of the challenges discussed above. According to a first aspect of the present disclosure, there is provided a method for allocating resources of fog nodes, wherein the fog nodes are organized into at least one fog network. The method comprises receiving a request from a client node, identifying requirements for fulfillment of the request and determining a location of the client node for fulfillment of the request. The method further comprises identifying, from the identified requirements and the determined location, a cluster of fog nodes operable to fulfill the request, and selecting, from the identified cluster, fog nodes the resources of which are to be allocated to fulfilling the request by minimizing at least one of a number of clusters required to fulfill the request, a total time to fulfill requests received by the fog nodes, and/or a number of unfulfilled requests received by the fog nodes.

According to examples of the present disclosure, a Fog node may comprise a node as defined in the Glossary of Terms Related to Fog Computing provided by the Open Fog Consortium: "The physical and logical network element that implements fog computing services that allow it to interoperate with other fog nodes. Fog nodes may be physical, logical, or virtual fog nodes and may be nested (e.g. a virtual fog node on a physical fog node)". The Open Fog Reference Architecture published by the Open Fog Consortium is included into IEEE standard 1934-2018. According to examples of the present disclosure, the fog nodes may be part of a communication network comprising a cloud level and a fog level. The cloud level may comprise one or more individual clouds and the fog level may comprise one or more individual fog networks. The fog level, and one, some or all of the fog networks within it, may comprise one or more hierarchical layers, comprising for example a regional, zonal, local and end point layer. According to examples of the present disclosure, communication between the fog nodes may be based on the Message Queuing Telemetry Transport (MQTT) protocol.

According to examples of the present disclosure, the request received from the client node may be received at a fog node with which the client node is in communication. The client node may be connected to a communication network of which the fog nodes are a part. The request may specify a task requiring the provision of one or more services.

According to examples of the present disclosure, identifying requirements for fulfillment of the request may comprise identifying a primary service for the request, wherein the primary service comprises a service provided by at least one fog node which service is necessary to fulfill the request, and identifying fog nodes operable to provide the primary service for the request.

According to examples of the present disclosure, the step of identifying requirements may comprise identifying multiple primary services that are necessary to fulfill the request.

According to examples of the present disclosure, identifying requirements for fulfillment of the request may further comprise identifying fog nodes operable to provide a secondary service for the request, wherein a secondary service comprises a service provided by at least one fog node which service is associated with a primary service for the request.

According to examples of the present disclosure, identifying fog nodes operable to provide a secondary service for the request may comprise identifying fog nodes comprised within a same matched neighborhood as an identified fog node operable to provide a primary service for the request. According to such examples, a matched neighborhood may comprise a plurality of fog nodes correlated according to at least one of a service request pattern for the services they provide and/or a trend variance pattern for the services they provide.

According to examples of the present disclosure, determining a location of the client node for fulfillment of the request may comprise estimating a trajectory of the client node on the basis of historical location data for the client node within an environment.

According to examples of the present disclosure, determining a location of the client node for fulfillment of the request may comprise modelling the environment as a location graph comprising vertices representing waypoints within the environment and edges representing legitimate paths between the waypoints.

According to examples of the present disclosure, identifying, from the identified requirements and the determined location, a cluster of fog nodes operable to fulfill the request may comprise generating at least one cluster comprising fog nodes that are operable to at least partially fulfill the request, within a threshold distance of each other at a particular point in time, and operable to cooperate with one another.

According to examples of the present disclosure, fog nodes operable to at least partially fulfill the request may comprise fog nodes identified as operable to provide a primary or secondary service for the request.

According to examples of the present disclosure, identifying, from the identified requirements and the determined location, a cluster of fog nodes operable to fulfill the request may further comprise identifying a generated cluster that is within a threshold distance of the client node, and determining, on the basis of the determined location and a time period for fulfillment of the request, whether the request can be fulfilled by the identified generated cluster.

According to examples of the present disclosure, the threshold may be absolute or relative, i.e. it may specify that a reference location of the cluster is within a threshold distance of the client node or it may require selection of the closest of the generated clusters.

According to examples of the present disclosure, identifying, from the identified requirements and the determined location, a cluster of fog nodes operable to fulfill the request may further comprise, if the request cannot be fulfilled by the identified generated cluster, generating a new cluster to fulfill the request.

According to examples of the present disclosure, identifying, from the identified requirements and the determined location, a cluster of fog nodes operable to fulfill the request may further comprise establishing groups of clusters, wherein a group of clusters comprises a plurality of clusters operable to cooperate, such that they form a chain of service provision.

According to examples of the present disclosure, owing to the dynamic nature of the clusters, and the possible mobility of the fog nodes within them, the chain may ensure service provision across a specific geographic area and over a specific time period.

According to examples of the present disclosure, identifying, from the identified requirements and the determined location, a cluster of fog nodes operable to fulfill the request may further comprise executing a density measure over the clusters, and eliminating clusters falling below a density threshold.

According to examples of the present disclosure, identifying, from the identified requirements and the determined location, a cluster of fog nodes operable to fulfill the request may further comprise updating the generated cluster or clusters.

According to examples of the present disclosure, the establishing of groups may also be updated following updating of the clusters. The summary section will also indicate that a copy of cluster distribution at a specific time may be stored and associated with a timestamp.

According to examples of the present disclosure, selecting, from the identified cluster, fog nodes the resources of which are to be allocated to fulfilling the request may comprise calculating an objective function minimizing a weighted sum of terms representing at least one of a number of clusters required to fulfill the request, a total time to fulfill requests received by the fog nodes, and/or a number of unfulfilled requests received by the fog nodes.

According to examples of the present disclosure, the objective function may comprise:

min $w_1 \Sigma_{k \in K} \Sigma_{oe} d_{xy} c_{xy} + w_z \Sigma_{k \in K} (r_{keK} - o_k - \tau_k) + w_g \Sigma_{rez} d_r$ where:

K is a set of service providers comprising the fog nodes;

E is a set of edges representing legitimate paths between waypoints in an environment;

$d_{xy}$ is a distance over an edge between a client node x and a fog node y;

$c_{xy}$ is a probability of client node x and fog node y meeting within N hops;

T is a non negative integer indicating an amount of time a client node x takes to reach a fog node k;

$a_k$ is a start time of a time window for provision of a service by the fog node k;

$\tau_k$ is a wait time between a client node arriving at a fog node k and receiving a service from the fog node k;

R is a non negative integer representing a minimum number of services provided by a fog node; and $d_r$ is binary decision variable that indicates if resources for a service request have been successfully allocated.

According to examples of the present disclosure, the set K of service providers may further comprise service providers in addition to the fog nodes, for example cloud service providers.

According to examples of the present disclosure, the method may further comprise initiating allocation of resources of the selected fog nodes to fulfill the received request.

According to examples of the present disclosure, the method may further comprise initiating caching of information about the selected fog nodes. According to such examples, the caching of information may enable rapid execution of the services for fulfilling the received request.

According to examples of the present disclosure, the method may further comprise fulfilling of the received request by the selected fog nodes.

According to examples of the present disclosure, the method may further comprise registering a new fog node and associating a service provided by the fog node with corresponding services provided by other fog nodes.

According to examples of the present disclosure, associating a service provided by the fog node with corresponding services provided by other fog nodes may comprise extracting information about the service from service metadata, calculating a measure of similarity between the extracted information and information extracted from metadata for services provided by other fog nodes and associating the service with a service provided by other fog nodes with which the service has a highest similarity score.

According to examples of the present disclosure, examples of a similarity score may include property-based similarity, structural similarity etc.

According to examples of the present disclosure, the method may further comprise assigning a key to associated services and generating a hash map that maps assigned keys to associated services provided by fog nodes.

According to examples of the present disclosure, the method may further comprise generating a graph of registered fog nodes in which vertices represent fog nodes and in which vertices are connected by at least one of: a location edge representing a physical topological connection between fog nodes, a service edge connecting fog nodes providing the same services and/or a service alliance edge connecting fog nodes providing services that are correlated.

According to examples of the present disclosure, a service edge connecting fog nodes providing the same services may be an edge connecting fog nodes having the same assigned key for their services.

According to examples of the present disclosure, the method may further comprise detecting a service request pattern between services provided by fog nodes, detecting a trend variance pattern between services provided by fog nodes, and generating service alliance edges in the graph of registered fog nodes on the basis of the detected service request patterns and trend variance patterns.

According to examples of the present disclosure, the method may further comprise weighting the generated service alliance edges according to the detected service request patterns and trend variance patterns.

Examples of service request patterns may include services that are frequently requested together, services that are frequently requested in sequence etc. Examples of trend variance patterns may include correlated location specific variance in trends of service requests.

According to examples of the present disclosure, the method may further comprise associating fog nodes into matched neighborhoods on the basis of the weights applied to service alliance edges between them.

According to such examples, associating fog nodes into matched neighborhoods on the basis of the weights applied to service alliance edges between them may comprise creating an adjacency matrix of the service alliance edge weights in the graph of registered fog nodes, normalising columns of the matrix, squaring the matrix, squaring columns of the matrix and normalising, setting matrix entries below a threshold value to zero, and repeating the process of squaring columns of the matrix and setting matrix entries below a threshold value to zero until the matrix is transformed into a near idempotent matrix. Associating fog nodes into matched neighborhoods on the basis of the weights applied to service alliance edges between them may further comprise row wise extraction of clusters from the final weights of the transformed matrix.

According to examples of the present disclosure, the method may further comprise registering a new client node, monitoring a location of the registered client node, and learning from the monitored location at least one trajectory within an environment that is associated with the registered client node.

According to examples of the present disclosure, a location of registered fog nodes may also be monitored for learning frequently travelled trajectories.

According to examples of the present disclosure, the method may further comprise modelling an environment within which the fog nodes are located as a location graph comprising vertices representing waypoints within the environment and edges representing legitimate paths between the waypoints.

According to examples of the present disclosure, the method may further comprise generating a connectivity matrix of the modelled environment, the connectivity matrix representing connectivity between legitimate paths of the environment.

According to examples of the present disclosure, the method may further comprise generating a path type matrix of the modelled environment, the path type matrix representing an assigned type of the legitimate paths in the environment.

According to examples of the present disclosure, a type of a path may be associated with a maximum or average speed over the path. According to examples of the present disclosure, a single path may have different types at different times of the day.

According to examples of the present disclosure, the method may further comprise generating a waypoint dimension matrix of the modelled environment, the waypoint dimension matrix representing a number of legitimate paths through the environment that meet at each waypoint.

According to examples of the present disclosure, the method may further comprise dividing the modelled environment into zones and distributing a zone of the modelled environment to a fog node within the zone.

According to examples of the present disclosure, each zone of the modelled environment may be downloaded to a "zonal" fog node within that zone.

According to examples of the present disclosure, certain method steps may be performed in a cloud level of the communication network, and certain method steps may be performed in a fog level of the communication network. Examples of steps that may be performed in a cloud level of the communication network include the registering of fog nodes and client nodes, generation of a hash map, fog node graph, modelled environment and estimated trajectory, and the formation of clusters. Examples of method steps which may be performed in a fog level of the communication network include the receipt of a request and selection of fog nodes from a cluster for fulfilling the request.

According to another aspect of the present disclosure, there is provided a computer program comprising instructions which, when executed on at least one processor, cause the at least one processor to carry out a method according to any one of the preceding aspects or examples of the present disclosure.

According to another aspect of the present disclosure, there is provided a carrier containing a computer program according to the preceding aspect of the present disclosure, wherein the carrier comprises one of an electronic signal, optical signal, radio signal or computer readable storage medium.

According to another aspect of the present disclosure, there is provided a computer program product comprising non transitory computer readable media having stored thereon a computer program according to a preceding aspect of the present disclosure.

According to another aspect of the present disclosure, there is provided a controller for allocating resources of fog nodes, wherein the fog nodes are organized into at least one fog network. The controller comprises a processor and a memory, the memory containing instructions executable by the processor such that the controller is operable to: receive a request from a client node, identify requirements for fulfillment of the request, determine a location of the client node for fulfillment of the request, and identify, from the identified requirements and the determined location, a cluster of fog nodes operable to fulfill the request. The controller is further operable to select, from the identified cluster, fog nodes the resources of which are to be allocated to fulfilling the request by minimizing at least one of: a number of clusters required to fulfill the request, a total time to fulfill requests received by the fog nodes, and/or a number of unfulfilled requests received by the fog nodes.

According to examples of the present disclosure, the controller may be further operable to carry out a method according to any one of the preceding aspects or examples of the present disclosure.

According to another aspect of the present disclosure, there is provided a controller for allocating resources of fog nodes, wherein the fog nodes are organized into at least one fog network. The controller is adapted to receive a request from a client node, identify requirements for fulfillment of the request, determine a location of the client node for fulfillment of the request, and identify, from the identified requirements and the determined location, a cluster of fog nodes operable to fulfill the request. The controller is further adapted to select, from the identified cluster, fog nodes the resources of which are to be allocated to fulfilling the request by minimizing at least one of: a number of clusters required to fulfill the request, a total time to fulfill requests received by the fog nodes, and/or a number of unfulfilled requests received by the fog nodes.

According to examples of the present disclosure, the controller may be further adapted to carry out a method according to any one of the preceding aspects or examples of the present disclosure.

BRIEF DESCRIPTION OF THE DRAWINGS

For a better understanding of the present disclosure, and to show more clearly how it may be carried into effect, reference will now be made, by way of example, to the following drawings, in which:

FIG. 5 is a block diagram illustrating functional modules in a controller;

FIG. 6 is a block diagram illustrating functional modules in another example of controller;

DETAILED DESCRIPTION

Figure 1:
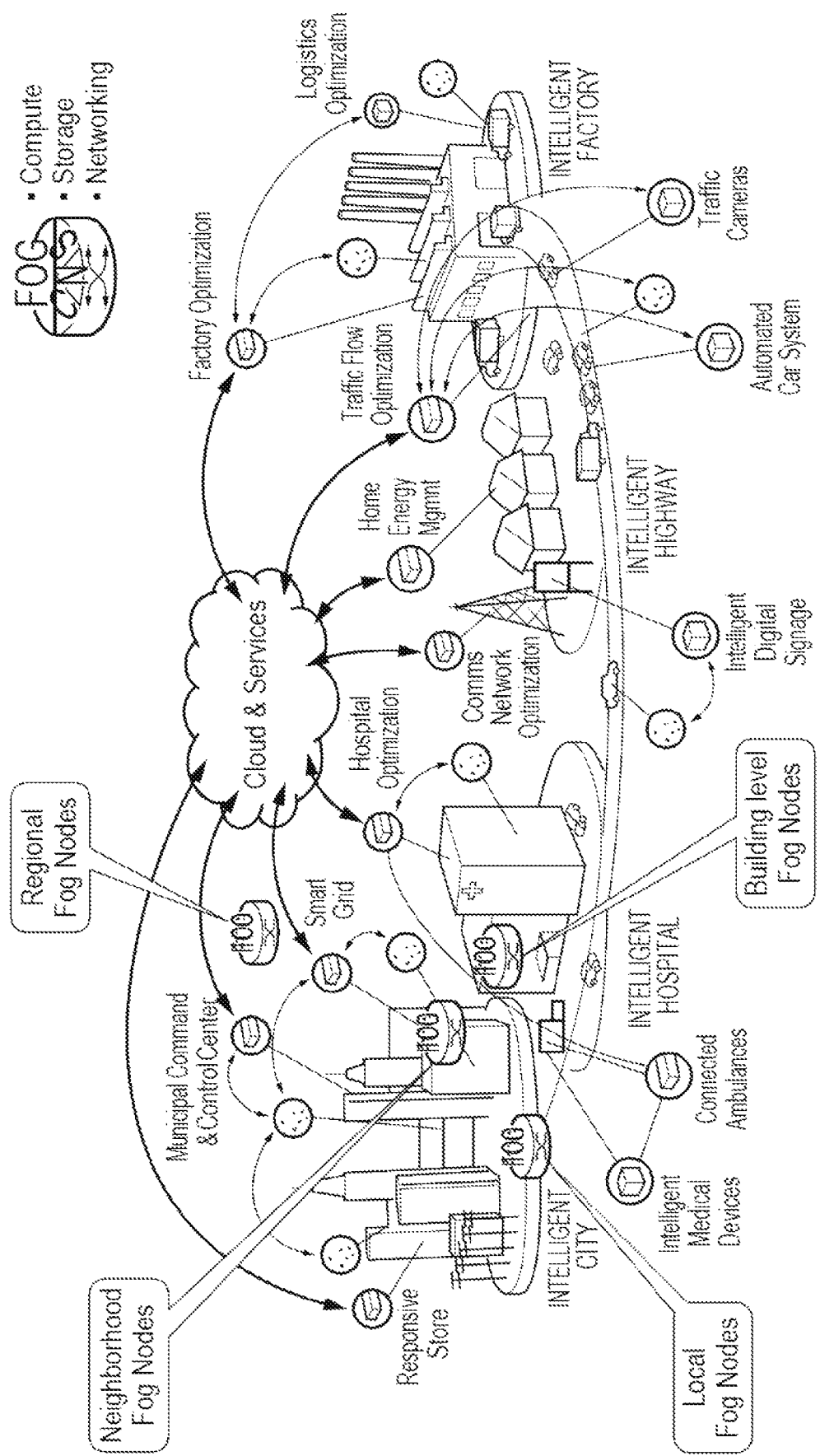
FIG. 1 illustrates a smart city environment.
Figure 2:
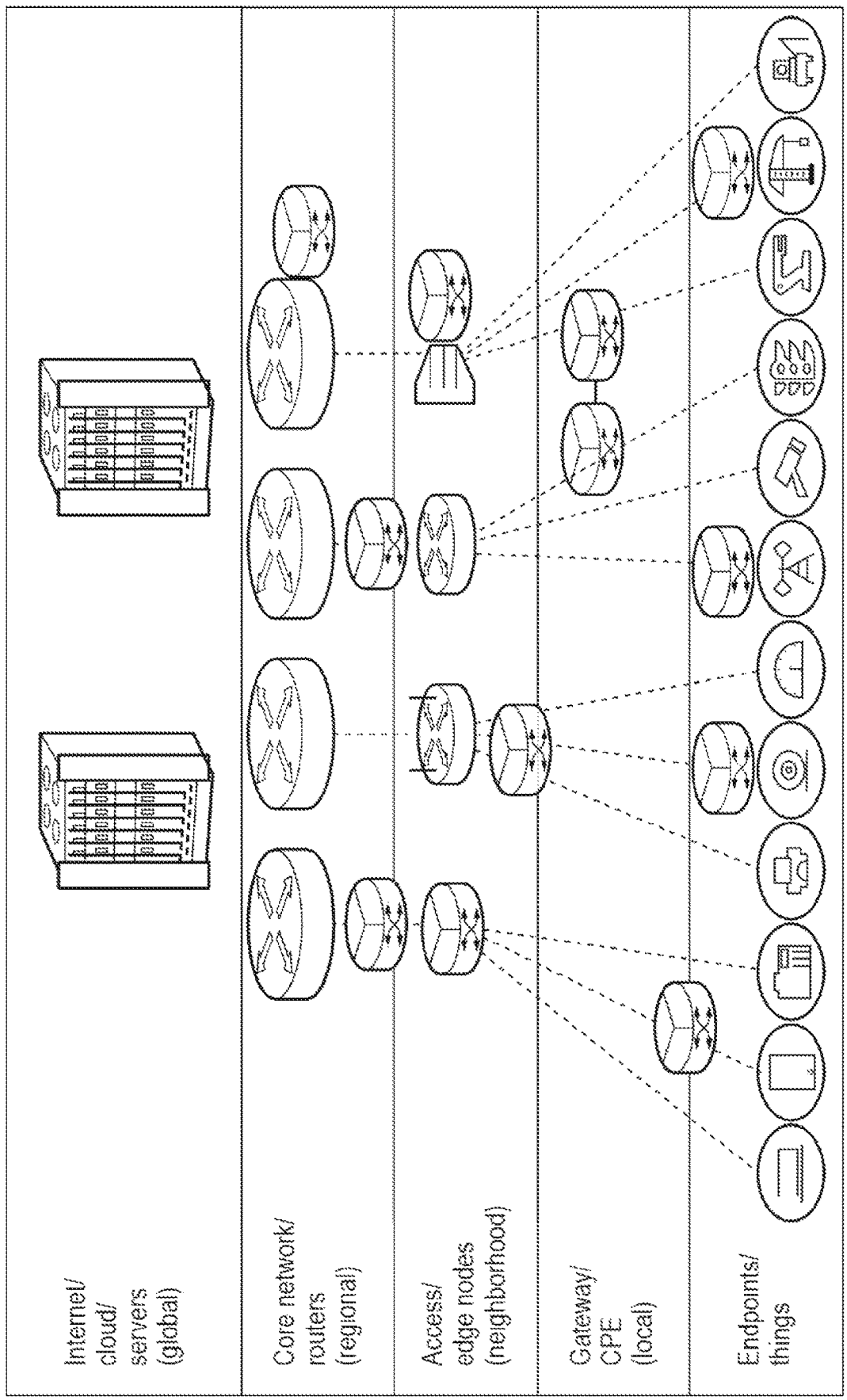
FIG. 2 illustrates a fog computing architecture.

Fog computing encourages a shift from handling computation and data storage in the core of cloud computing to handling this at the edges of a network. Instead of sending all the data collected to the cloud, fog computing suggests processing the data at leaf nodes or at the edges. This idea is also called 'edge analytics'. Local data processing helps to mitigate certain weakness of cloud computing and, also offers new advantages, such as greater context-awareness, real-time processing, lower bandwidth requirement, etc. Many of these advantages are dependent upon location awareness of fog nodes and the allocation of appropriate resources. Fog network architectures may therefore be anticipated that use one or a collaborative multitude of end-user fog clients or near-user edge devices to carry out a substantial amount of storage, communication, and control, configuration, measurement and management in assisting connected systems such as a vehicle, human agent, drone, etc. Fog Radio Access Network (RAN) may also play a role in meaningful communication by way of context aware recovery and through dynamic collaboration between fog RAN nodes. As discussed above for other example fog applications, the resource allocation challenge is to identify and combine (RAN) fog nodes according to location, capability and specific needs of a connected system to carry out a requested task. Examples of the present disclosure seek to address this challenge.

Different fog nodes or systems may collaborate with each other to jointly support an application. For example, multiple fog systems can share data storage and computing tasks for one or multiple users or applications. Different fog nodes or systems can also collaborate to serve as backups for each other. Addressing the oscillations in Fog networking, taking account of divergence and global configuration consistency during the interaction of local actions, complicates the task of resource allocation. An understanding of the dynamic context of fog nodes in order to resource actions required to fulfill a request may assist with resource allocation.

Examples of the present disclosure propose a method which first understands the required nodes from the fog networking by considering the inherent characteristics of the fog nodes and the requirements of a connected system. This understanding arises from a determination of context based on requirements to fulfill a request, and from clustering different fog nodes which may represent different environments in fog networking to induce a collaborative action within a selected cluster of fog nodes. Resource allocation and task scheduling is thus performed within a selected group of fog nodes to undertake local actions to fulfill a connected system request. Examples of the present disclosure offer an end-to-end solution which may be implemented through cohesive modules configured to represent an environment and perform dynamic clustering in Fog networking to initiate collaborative actions and respond to a request from a connected system. The cohesive modules may include service registration, graph representation, understanding contextual knowledge, localization and formation of distributed network prototype. Dynamic clustering to find relevant fog nodes and cache prefetching, which may be implemented using such modules, may ensure a context-aware dynamic collaboration between fog nodes is executed to complete the local actions to respond to a request from a connected system.

Examples of the present disclosure enable the fog nodes to work collaboratively in a dynamic environment. Resource allocation and task scheduling may be done dynamically by the selected fog nodes with context awareness to perform local actions requested by a connected system. Understanding the order of executing the steps (explicit context) allows the fog level of a communication network to perform a required task requested by a connected system. Examples of the present disclosure may be summarised in three steps:

Dynamic clustering can be performed to including only specific fog nodes from fog networking in handling context aware dynamic collaboration for specific decision making (perform required local actions needed by a connected system).

Executing tasks in sequential order by the selected group of fog nodes which has been identified by the understanding of the required local context.

An end to end model executes context aware resource allocation and task scheduling to perform local actions that fulfill a request from a connected system dynamically.

Examples of the proposed method exploit understanding of semantics and context in Fog networking and generate a solution, which can be extended to use in any new environments of Industrial IOT, Smart cities and Smart Home, Manufacturing 4.0, etc.

Figure 3:
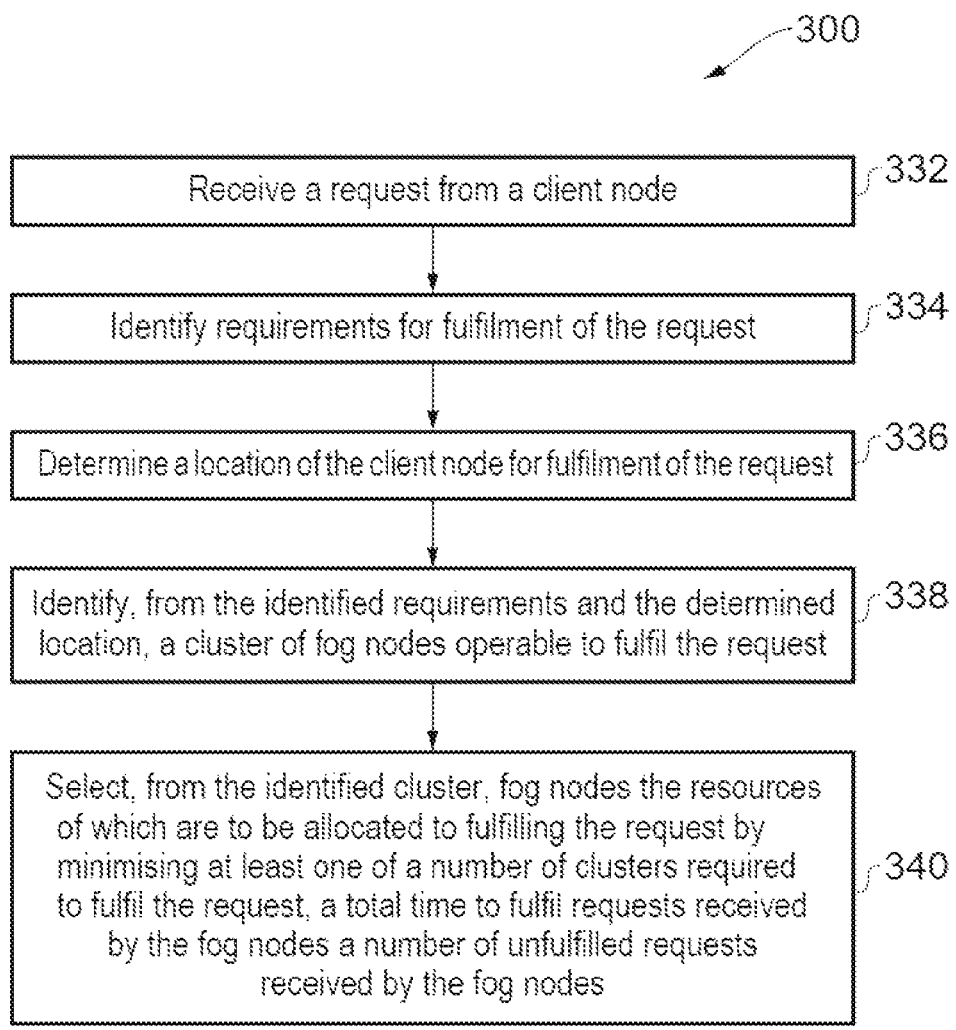
FIG. 3 is a flow chart illustrating process steps in a method for allocating resources of fog nodes.

FIG. 3 is a flow chart illustrating process steps in a method 300 for allocating resources of fog nodes, wherein the fog nodes are organized into at least one fog network. The fog nodes may be part of a communication network comprising a cloud level and a fog level. The cloud level may comprise one or more individual clouds and the fog level may comprise one or more individual fog networks. The fog level, and one, some or all of the fog networks within it, may comprise one or more hierarchical layers, comprising for example a regional, zonal, local and end point layer. The method may be conducted at a cloud level, fog level or may be shared between the cloud level and the fog level of the network. Referring to FIG. 3, in a first step 332, the method comprises receiving a request from a client node. In step 334, the method comprises identifying requirements for fulfillment of the request and, in step 336, the method comprises determining a location of the client node for fulfillment of the request. In step 338, the method comprises identifying, from the identified requirements and the determined location, a cluster of fog nodes operable to fulfill the request. Finally, in step 340, the method comprises selecting, from the identified cluster, fog nodes the resources of which are to be allocated to fulfilling the request by minimizing at least one of: a number of clusters required to fulfill the request, a total time to fulfill requests received by the fog nodes and/or a number of unfulfilled requests received by the fog nodes. The request received from the client node may be received at a fog node with which the client node is in communication. The client node may be connected to a communication network of which the fog nodes are a part. The request may specify a task requiring the provision of one or more services.

FIGS. 4*a* to 4*d* show a flow chart illustrating process steps in another example of a method 400 for allocating resources of fog nodes, wherein the fog nodes are organized into at least one fog network. The steps of the method 400 illustrate one way in which the steps of the method 300 may be implemented and supplemented in order to achieve the above discussed and additional functionality. As for the method of FIG. 3 above, the fog nodes may be part of a communication network comprising a cloud level and a fog level. The cloud level may comprise one or more individual clouds and the fog level may comprise one or more individual fog networks. The fog level, and one, some or all of the fog networks within it, may comprise one or more hierarchical layers, comprising for example a regional, zonal, local and end point layer. The method may be conducted at a cloud level, fog level or may be shared between the cloud level and the fog level of the network. The following description provides an overview of the method 400, and is followed by a more detailed discussion of certain steps and the functional modules via which they may be implemented.

Figure 4A:
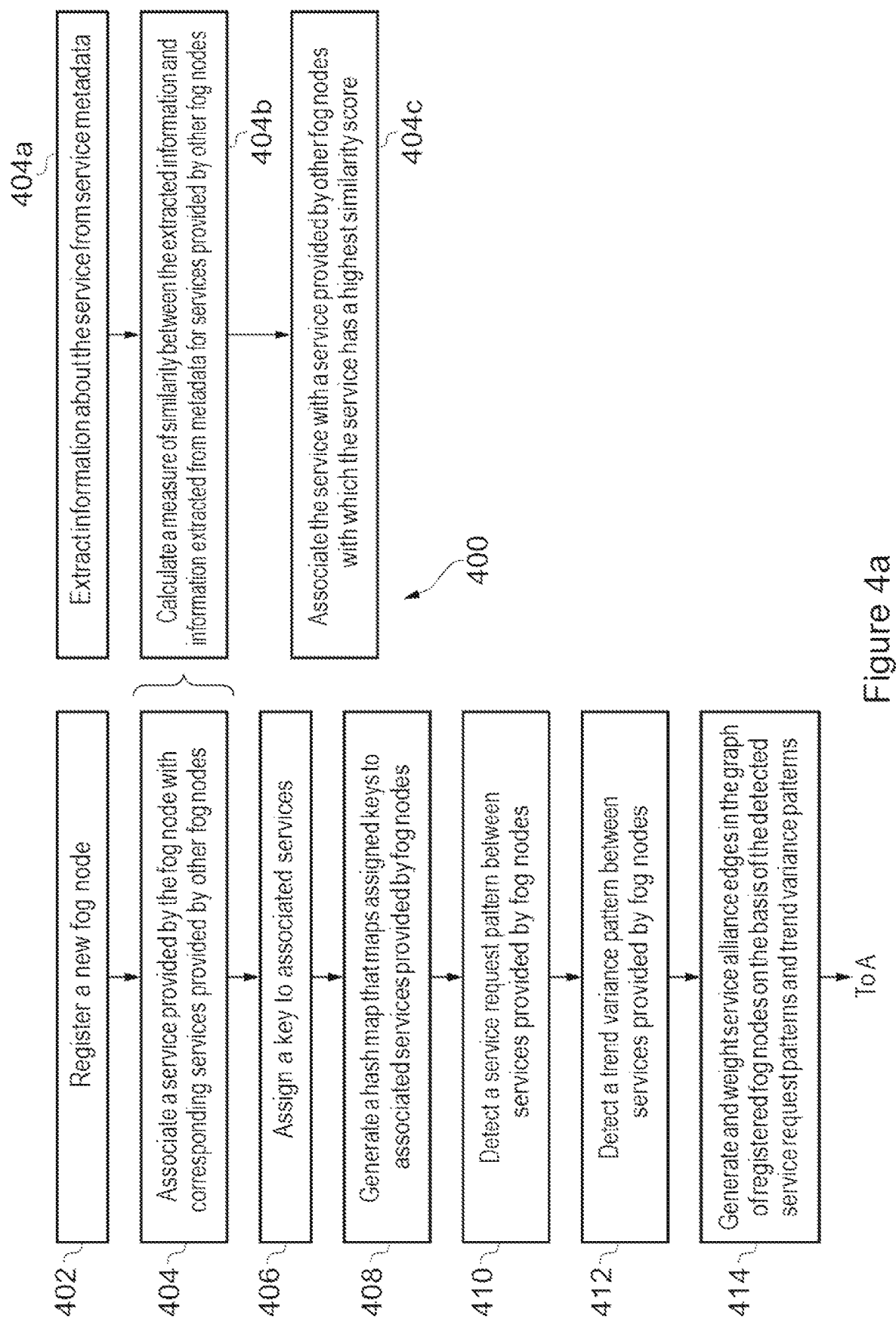
FIGS. 4a to 4d are flow charts illustrating process steps in another example of method for allocating resources of fog nodes.

Referring first to FIG. 4*a*, the method 400 comprises registering a new fog node in step 402 and associating a service provided by the fog node with corresponding services provided by other fog nodes in step 404. The fog node may be associated with an IoT device such as a sensor, actuator etc. The fog node may be associated with one or more resources, through which the fog node may provide services. Associating a service provided by the fog node with corresponding services provided by other fog nodes comprises extracting information about the service from service metadata in step 404a, calculating a measure of similarity between the extracted information and information extracted from metadata for services provided by other fog nodes in step 404b, and associating the service with a service provided by other fog nodes with which the service has a highest similarity score in step 404c. Example similarity scores include property-based similarity, structural similarity etc., as discussed in further detail below.

The method 400 further comprises assigning a key to associated services in step 406 and generating a hash map that maps assigned keys to associated services provided by fog nodes in step 408. In step 410, the method 400 comprises detecting a service request pattern between services provided by fog nodes, and in step 412, the method comprises detecting a trend variance pattern between services provided by fog nodes. Service request and trend variance patterns are discussed in greater detail below.

The method 400 further comprises, in step 414, generating and weighting service alliance edges for a graph of registered fog nodes on the basis of the detected service request patterns and trend variance patterns.

Figure 4B:
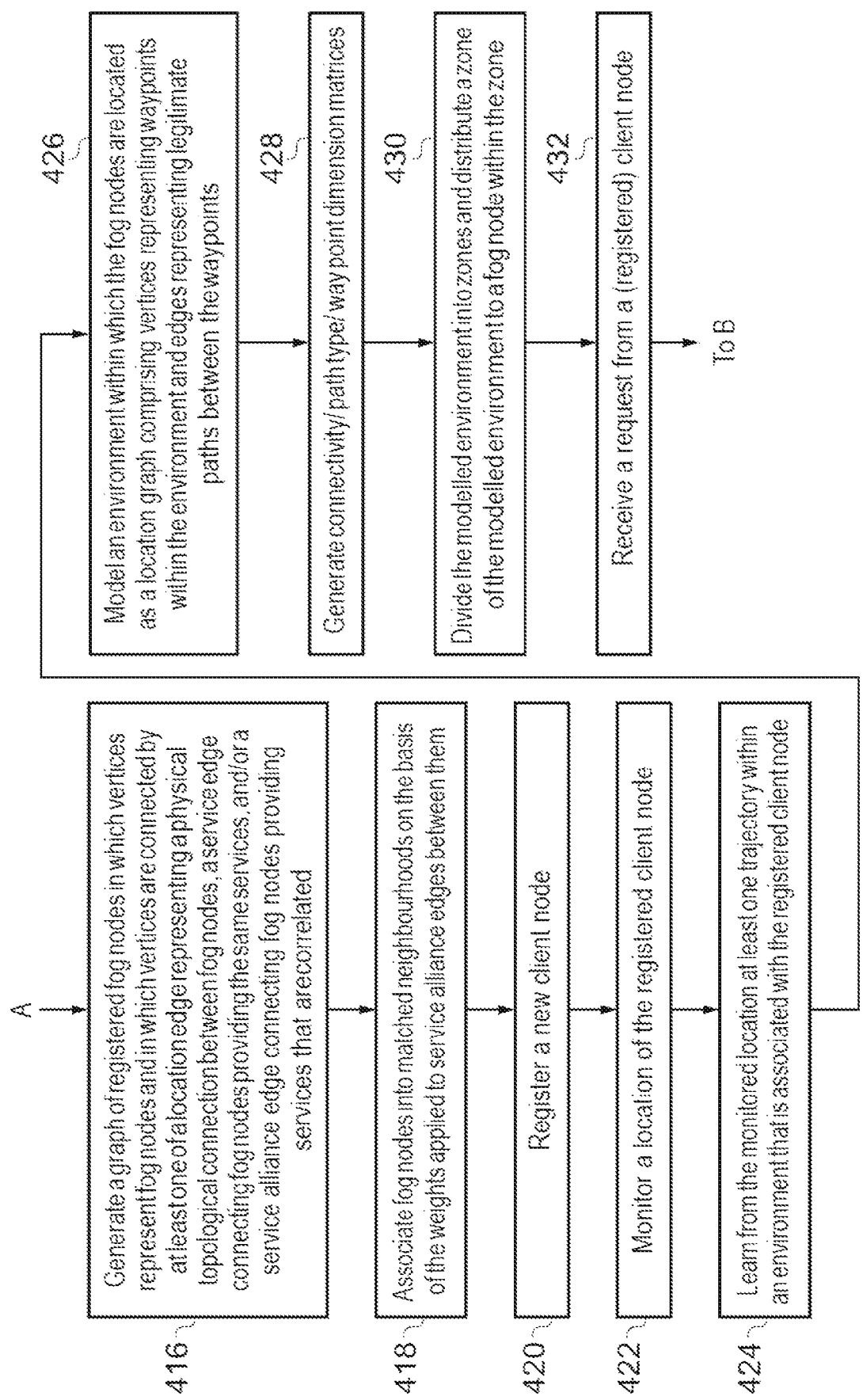

Referring to FIG. 4b, the method 400 further comprises, in step 416, generating a graph of registered fog nodes in which vertices represent fog nodes and in which vertices are connected by at least one of a location edge representing a physical topological connection between fog nodes a service edge connecting fog nodes providing the same services and/or a service alliance edge connecting fog nodes providing services that are correlated, as generated and weighted in step 414. In some examples, an edge connecting fog nodes providing the same services may be an edge connecting fog nodes having the same assigned key for their services.

The method 400 further comprises associating fog nodes into matched neighborhoods on the basis of the weights applied to service alliance edges between them. This may comprise creating an adjacency matrix of the service alliance edge weights in the graph of registered fog nodes, normalising columns of the matrix, squaring the matrix, squaring columns of the matrix and normalising, setting matrix entries below a threshold value to zero, and repeating the process of squaring columns of the matrix and setting matrix entries below a threshold value to zero until the matrix is transformed into a near idempotent matrix. Associating fog nodes into matched neighborhoods on the basis of the weights applied to service alliance edges between them may further comprise row wise extraction of clusters from the final weights of the transformed matrix, each cluster comprising a matched neighborhood.

The method 400 further comprises registering a new client node (which may for example comprise a connected system such as a vehicle, human agent, drone etc.) in step 420, monitoring a location of the registered client node in step 422 and learning from the monitored location at least one trajectory within an environment that is associated with the registered client node. In some examples of the method 400, a location of registered fog nodes may also be monitored for learning frequently travelled trajectories.

The method 400 further comprises, in step 426, modelling an environment within which the fog nodes are located as a location graph comprising vertices representing waypoints within the environment and edges representing legitimate paths between the waypoints. The method 400 further comprises, in step 428, generating matrices of the environment. These matrices comprise a connectivity matrix of the modelled environment, the connectivity matrix representing connectivity between legitimate paths of the environment, a path type matrix of the modelled environment, the path type matrix representing an assigned type of the legitimate paths in the environment, and a waypoint dimension matrix of the modelled environment, the waypoint dimension matrix representing a number of legitimate paths through the environment that meet at each waypoint. The type of a path for the path type matrix may be associated with a maximum or average speed over the path. Path type may change with time in that a single path may have different types at different times of the day. Matrix generation is discussed in greater detail below.

The method 400 further comprises dividing the modelled environment into zones and distributing a zone of the modelled environment to a fog node within the zone in step 430. Each zone of the modelled environment may be downloaded to a "zonal" fog node within that zone.

Figure 4C:
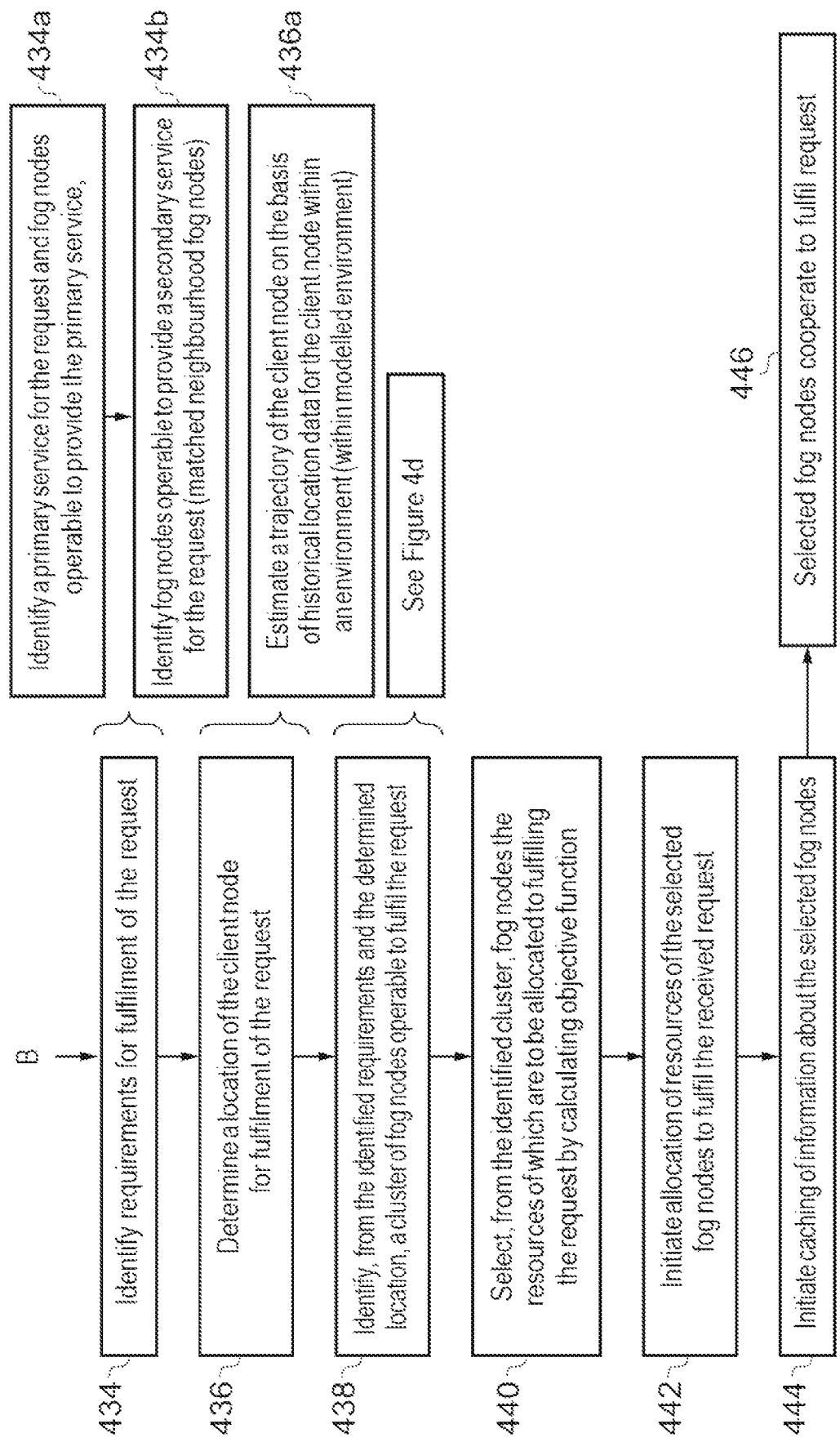

The method 400 further comprises receiving a request from a client node in step 432 and, as illustrated in FIG. 4c, identifying requirements for fulfillment of the request. The request received from the client node may be received at a fog node with which the client node is in communication. The client node may be connected to a communication network of which the fog nodes are a part. The request may specify a task requiring the provision of one or more services.

The step 434 of identifying requirements for fulfillment of the request may comprise identifying one or more primary services for the request, wherein a primary service comprises a service provided by at least one fog node which service is necessary to fulfill the request, and identifying fog nodes operable to provide the primary services for the request in step 434a. Identifying requirements may also comprise, in step 434b, identifying fog nodes operable to provide a secondary service for the request, wherein a secondary service comprises a service provided by at least one fog node which service is associated with a primary service for the request. As illustrated in step 434b, identifying fog nodes operable to provide a secondary service for the request comprises identifying fog nodes comprised within a same matched neighborhood as an identified fog node operable to provide a primary service for the request. As discussed above, a matched neighborhood comprises a plurality of fog nodes correlated according to at least one of a service request pattern for the services they provide and/or a trend variance pattern for the services they provide.

The method 400 further comprises determining a location of the client node for fulfillment of the request, in step 436. This may comprise, in step 436a, estimating a trajectory of the client node on the basis of historical location data for the client node within an environment (which may be the modelled environment of step 436).

In step 438, the method 400 comprises identifying, from the identified requirements and the determined location, a cluster of fog nodes operable to fulfill the request. Sub steps that may be involved in this process step are illustrated in FIG. 4d.

Figure 4D:
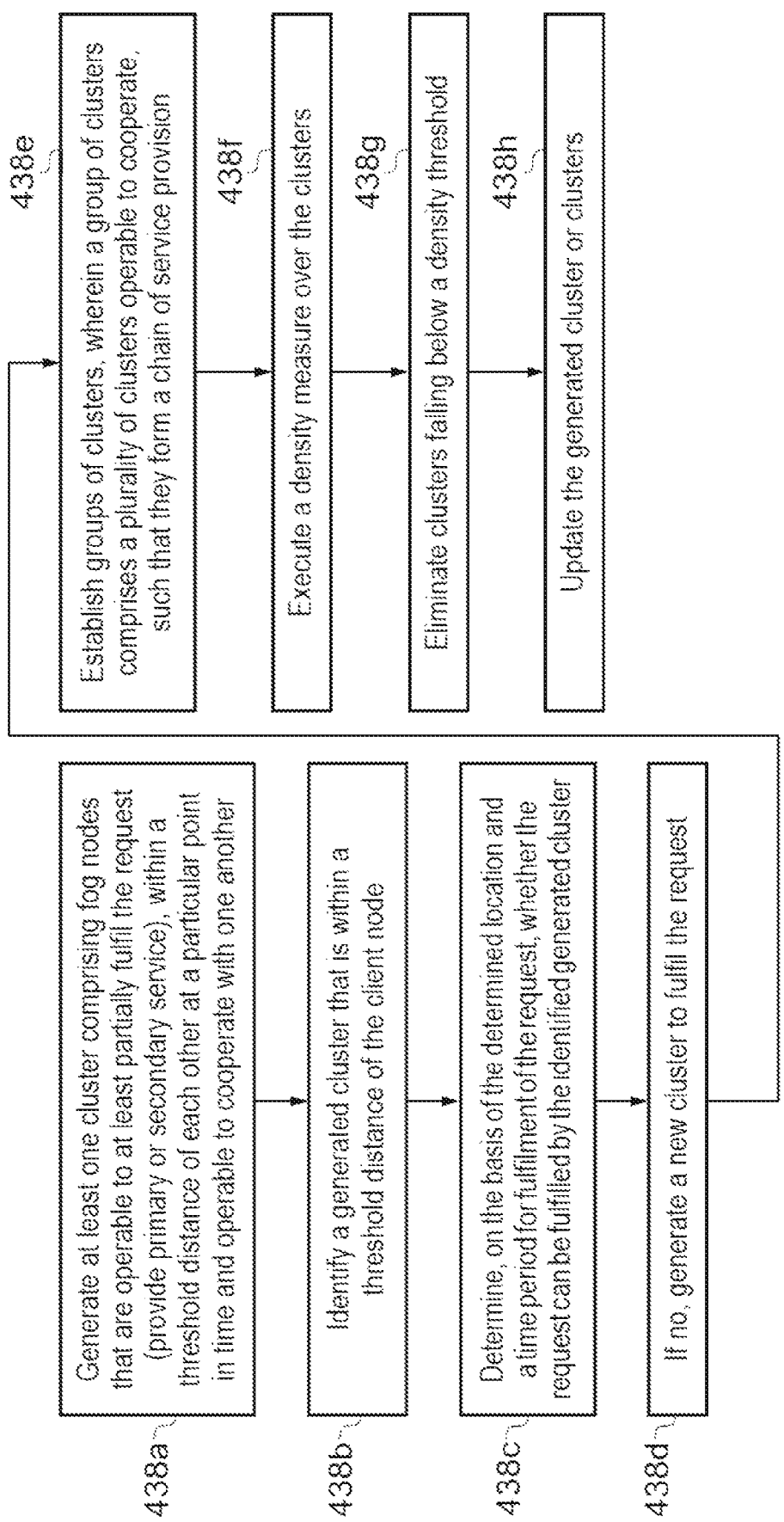

Referring to FIG. 4d, in a first sub step 438a, step 438 comprises generating at least one cluster comprising fog nodes that are operable to at least partially fulfill the request, within a threshold distance of each other at a particular point in time, and operable to cooperate with one another. Fog nodes operable to at least partially fulfill the request may comprise fog nodes identified as operable to provide a primary or secondary service for the request. Step 438 further comprises identifying a generated cluster that is within a threshold distance of the client node in sub step 438b, and determining, on the basis of the determined location and a time period for fulfillment of the request, whether the request can be fulfilled by the identified generated cluster in sub step 438c. The threshold distance may be absolute or relative, i.e. it may specify that a reference location of the cluster is within the threshold distance of the client node or it may require selection of the closest of the generated clusters.

If the request cannot be fulfilled by the identified generated cluster, step 438 comprises generating a new cluster to fulfill the request in sub step 438d. Step 438 further comprises, in sub step 438e, establishing groups of clusters, wherein a group of clusters comprises a plurality of clusters operable to cooperate, such that they form a chain of service provision. Owing to the dynamic nature of the clusters, and the possible mobility of the fog nodes within them, the chain may ensure service provision across a specific geographic area and over a specific time period. Step 438 then comprises executing a density measure over the cluster in sub step 438f, eliminating clusters falling below a density threshold in sub step 438g, and updating the generated cluster or clusters in sub step 438h. The establishing of groups of clusters may also be updated following updating of the clusters. In some examples, a copy of cluster distribution at a specific time may be stored and associated with a timestamp.

Referring again to FIG. 4c, after identifying a cluster of fog nodes operable to fulfill the request, the method 400 comprises selecting, from the identified cluster, fog nodes the resources of which are to be allocated to fulfilling the request by minimizing at least one of a number of clusters required to fulfill the request, a total time to fulfill requests received by the fog nodes and/or a number of unfulfilled requests received by the fog nodes. This selecting step may comprise calculating an objective function minimizing a weighted sum of terms representing at least one of a number of clusters required to fulfill the request, a total time to fulfill requests received by the fog nodes, and/or a number of unfulfilled requests received by the fog nodes.

The objective function may comprise:

$$\min \ w_1 \Sigma_{k \in K} \Sigma_{oe} d_{xy} + c_{xy} + w_2 \Sigma_{k \in K} (r_{keK} - o_k - \tau_k) + w_g \Sigma_{rez} d_r$$

where:

K is a set of service providers comprising the fog nodes;

E is a set of edges representing legitimate paths between waypoints in an environment;

$d_{xy}$ is a distance over an edge between a client node x and a fog node y;

$c_{xy}$ is a probability of client node x and fog node y meeting within N hops;

T is a non-negative integer indicating an amount of time a client node x takes to reach a fog node k;

$a_k$ is a start time of a time window for provision of a service by the fog node k;

$\tau_k$ is a wait time between a client node arriving at a fog node k and receiving a service from the fog node k;

R is a non-negative integer representing a minimum number of services provided by a fog node; and $d_r$ is binary decision variable that indicates if resources for a service request have been successfully allocated.

The set K of service providers may further comprise service providers in addition to the fog nodes, for example cloud service providers.

The method 400 further comprises initiating allocation of resources of the selected fog nodes to fulfill the received request in step 442, initiating caching of information about the selected fog nodes in step 444 and fulfilling of the received request by the selected fog nodes in step 446.

It will be appreciated that the example method 400 demonstrates one way in which features of the present disclosure may be combined. In other examples, details such as the order of certain steps may be changed.

As discussed above, the methods 300 and 400 are performed in a communication network comprising a plurality of fog nodes. Steps of the methods may be performed in a cloud level, a fog level or shared between a cloud level and a fog level of the communication network. The present disclosure provides a controller which is adapted to perform any or all of the steps of the above discussed methods. The controller may be a logical function, elements of which are divided between a cloud layer and a fig layer of a communication network.

FIG. 5 is a block diagram illustrating an example controller 500 which may implement the method 300 and/or 400 according to examples of the present disclosure, for example on receipt of suitable instructions from a computer program 550. Referring to FIG. 5, the controller 500 comprises a processor or processing circuitry 502, and may comprise a memory 504 and interfaces 506. The processing circuitry 502 is operable to perform some or all of the steps of the method 300 and/or 400 as discussed above with reference to FIGS. 3 and 4a to 4d and below with reference to FIGS. 7 to 9. The memory 504 may contain instructions executable by the processing circuitry 502 such that the controller 500 is operable to perform some or all of the steps of the method 300 and/or 400. The instructions may also include instructions for executing one or more telecommunications and/or data communications protocols. The instructions may be stored in the form of the computer program 550. In some examples, the processor or processing circuitry 502 may include one or more microprocessors or microcontrollers, as well as other digital hardware, which may include digital signal processors (DSPs), special-purpose digital logic, etc. The processor or processing circuitry 502 may be implemented by any type of integrated circuit, such as an Application Specific Integrated Circuit (ASIC), Field Programmable Gate Array (FPGA) etc. The memory 504 may include one or several types of memory suitable for the processor, such as read-only memory (ROM), random-access memory, cache memory, flash memory devices, optical storage devices, solid state disk, hard disk drive etc.

FIG. 6 illustrates functional units in another example of controller 600 which may execute examples of the methods 300 and/or 400 of the present disclosure, for example according to computer readable instructions received from a computer program. It will be understood that the units illustrated in FIG. 6 are functional units, and may be realised in any appropriate combination of hardware and/or software. The units may comprise one or more processors and may be integrated to any degree.

Referring to FIG. 6, the controller 600 comprises a receiving module 602 for receiving a request from a client node, a requirements module 604 for identifying requirements for fulfillment of the request, a location module 606 for determining a location of the client node for fulfillment of the request, a cluster module 608 for identifying, from the identified requirements and the determined location, a cluster of fog nodes operable to fulfill the request, and a selection module 610 for selecting, from the identified cluster, fog nodes the resources of which are to be allocated to fulfilling the request by minimizing at least one of a number of clusters required to fulfill the request, a total time to fulfill requests received by the fog nodes, and/or a number of unfulfilled requests received by the fog nodes. The controller 600 may also comprise interfaces 612. According to different examples of the controller 600, the controller 600 may further comprise functional modules for performing additional steps as set out in the description of FIGS. 4a to 4d above. Such modules or their outputs may be consulted by the modules illustrated in FIG. 6 in order to perform their functions. Examples of such units are discussed in further detail below.

Referring again to FIG. 4a, registration of new fog nodes, association of service provided with other services, assigning of keys and generation of a hash map (steps 402 to 408), may be performed by a Hash Map Generator module. There may be multiple manufactures who have developed IoT devices and fog nodes in a smart city model or other fog computing use case. Among such manufactures, different syntax may be used to describe the same information, creating inconsistency. To address this, the, when fog nodes and their associated IoT devices are registered in the cloud, keywords of their services are extracted from device metadata and datasheets. A cloud side application within the hash map generator module makes a hash-map for all similar kinds of services and generates a unique key. For example, the OBU (on-board unit) of a smart vehicle may provide location data that can be tagged as 'location' or 'coordinates' or 'position' or 'point', 'X-Y values', 'GPS location' etc. by different manufactures. Similarly, a temperature sensor can denote values as 'temp' or 'temperature' or 'tmp' depending upon the manufacturer. The cloud-based application should group the similar kind of tags into same group. So, 'temp', 'temperature' and 'tmp' should be grouped into same category. For example, all fog nodes handling 'environment' related data may be grouped into same category and the category given a unique key, for example 248000, in the hash-map. In the environment fog, IoT devices or lowest level fog nodes handling 'temperature' data may be given a unique key of 248001, nodes handling CO2 data may be given key of 248002 and so on. The above service keyword forms are contextually grouped and considered in the following algorithm. This could be achieved through property-based, structure-based and Instance-based similarity measures.

---

Service Matching Algorithm

---
Input: existing fog services (S), new fog service (n), domain wordnet, device metadata and datasheets
Output: maximum matching score
```
    1:   procedure Service_Matching( )
    2:     similarityIndex Set := { }
    3:     similarityIndex := 0
    4:     FOR each service s in existing fog services set (S):
    5:       count similarityIndex between s and n based upon weighted
    relational similarity from domain WordNet, property based
    similarity, structural similarity and instances based similarity
    6:       IF similarityIndex > = Threshold θ THEN
    7:         insert the score into similarityIndex set
    8:       ELSE discard score
    9:       END IF
   10:       similarityIndex := 0
   11:     END FOR
   12:     sort similarityIndex set
   13:     return maximum matching score
   14:   END procedure
```
---

A new service is merged with the existing service with which it obtains the maximum matching score in grouping the specific categories of items. The outcome of this module is a hash-map where services provided by fog nodes are grouped together and assigned with unique keys.

Referring now to FIG. 4b, the steps of generating a graph of registered fog nodes and associating fog nodes into matched neighborhoods may be performed by a hybrid graph generator block. The fog network hierarchy is stored as a graph in a cloud where fog nodes and underlying IoT devices become vertices denoted with their unique keys as per their services.

There are three kinds of edges in this hybrid graph

Type 1 edges are unweighted and connect the hierarchical fog nodes (vertices) to represent their physical topology.

Type 2 edges connect vertices having the same unique keys.

Type 3 edges, alliance edges, are weighted where weight represents the allied score between two vertices (fog nodes).

In a practical scenario, on a service request, if two fog nodes provide data/service together then their allied score is increased. For example, weather fog nodes and traffic fog nodes can have high allied score as they may often provide service together; traffic conditions being dependent on current weather conditions (raining, foggy, smog etc.).

Smart vehicles can fetch weather information and traffic information together to decide expected commuting time to a destination. A simpler correlation between different set of fog nodes is possible with this representation to understand the related fog nodes for resolving certain issues relevant to a location.

The outcome of this module is a graph of fog network hierarchy with 3 types of edges mentioned above, which graph may assist with identifying related fog nodes, as discussed in further detail below. This could be done without context, but with earlier knowledge.

An alliance edge finder block may implement steps 410 to 414 of FIG. 4a, by making alliance edges in the hybrid graph. This module may enable the dynamic context discovery within the allied scores in hybrid graph. The alliance edges and their scores are made in two different ways: by finding a) service request pattern and b) variance pattern.

a. Service request pattern: During training phase, this block detects the pattern of arrival of service requests from clients. There would be some fog services mostly called together or sequentially. For example: on a rainy day, traffic condition service and weather condition service requests can arrive at approximately the same time. The alliance edges between vertices may be created based on this association.

b. Variance Pattern: The cloud server-side application automatically discovers the association of services by trend analysis without explicit service requests from clients. From different kind of unique fog services registered, it detects correlated, location specific variance in trends and thus discovers the associated services that vary together. The alliance edges between vertices may also be created based on this association.

Inside the hybrid graph generator block, a neighborhood selection block may exist that runs the algorithm presented below to group neighbors into matched neighborhoods which may be helpful for generating context aware dynamic clustering, resource allocation and finally task scheduling (step 418 of FIG. 4a).

```
Input: Hybrid graph with alliance scores among edges, w₁ = weight for service
pattern association score, w₂ = weight for variance pattern association score
Output: Grouped nodes with matched neighbors.
   1: Procedure Neighborhood_Selection( ):
   2:    Create adjacency matrix M from Hybrid graph in which edge is weighted as
(w₁*service pattern association score + w₂*variance pattern association score).
   3:    Perform Min-Max Normalization for each column of matrix.
   4:    Get squared form of the Matrix (M.M)
   5:    Square each column of M and perform Min-Max Normalization.
   6:    Make near zero (below a threshold ε) values to zero.
   7:    Repeat step 5 and 6 till M is transformed into a near idempotent matrix.
   8:    Row wise extract cluster from final weights of transformed M.
   9: END procedure
```

Registering of new fog nodes (step 420 of FIG. 4b) may be performed by a registration module. To access the fog networking services in a smart city or other paradigm, client devices (smart vehicles, smart home, IoT devices etc.) should first be registered and issued with a unique registration key. To address the localisation problem, it is helpful to know the client's location and mobility pattern. There can be mobile as well as static clients. The movement of mobile clients (step 424 of FIG. 4b) may be estimated using a Trajectory estimator module. This module considers the location of mobile clients based on certain parameters. In the present disclosure, a mobility vector consisting of three parameters is considered: location-latitude, location-longitude and velocity of mobile clients.

$$x = \begin{bmatrix} \varphi \\ \lambda \\ v_n \end{bmatrix} = \begin{bmatrix} \text{latitude} \\ \text{longitude} \\ \text{velocity} \end{bmatrix}$$

Route estimation is based on location traces of visited segments. Over time, visited segments are settled into a pattern and followed regularly by IoT devices. These patterns can be learnt from historical data and maximum speed limit assigned for the environment (here we represent a specific street in a location). There are also some random factors that can cause exceptions to established patterns, for example traffic flow on a highway can change owing to an accident or emergency situation. Such exceptions can still be learned or accommodated after a certain period or from the pattern of average speed of previous nodes. These random factors may not assist in predicting node's location, but cane be considered in adaptive location data transmission. The outcome of this module is a set of frequently travelled trajectories of registered clients.

Modeling an environment and generating matrices representing the environment, (steps 426 and 428 of FIG. 4b), may be implemented by a Street Network Creator (SNC) and Street Network Prototype. The mobility of clients in a city network is not entirely random. It has been demonstrated that human trajectories show a high degree of temporal and spatial regularity, each being characterised by a time independent characteristic travel distance and a significant probability to return to a few highly frequented locations. Studies indicate that despite the diversity of driver travel history, drivers follow simple reproducible patterns.

The SNC module considers a mobility framework of mobile clients to execute local actions that will fulfill a client node's request, even though the client's location and velocity may change over time. The Random Waypoint (RWP) model is widely used in simulating protocols designed for mobile ad hoc networks. Each mobile client picks a random direction uniformly at random from (0, 2π] and moves to a random destination d uniformly within the underlying spherical space (earth surface), and travels with a speed v whose value is uniformly chosen in the interval (0, Vmax). Each client pauses for a random time after each move. Destination d is exponentially distributed random variable with mean μ. At time t, the locations of the mobile clients are independent of each other.

However, for actual mobile clients' movements in a smart city streets network, client devices do not travel in an open field with arbitrary pause time, arbitrary speed distribution and direction. Movement constraints exist that limit their mobility according to local congestion and control mechanisms. The SNC module adapts to any connected system for new, extended mobility modelling, particularly for street networks with practical constraints.

A city street network can be represented as a Graph G (V, E) with V vertices set and E edges set, $E \subseteq$. This graph G is developed from the map data of a city with corresponding location data and traffic information. A weight function w: $E \rightarrow R_D^+$ assigns a non-negative weight to every edge to represent the length. The length of a curved street having multiple edges is calculated as summation of straight edges. A path from source node $n_1$ to destination node $n_d$ is actually a sequence of edges $(n_1, n_2), (n_3, n_4), \ldots, (n_{d-1}, n_d)$ represented as a sequence of vertices $(n_1, n_2, n_2, \ldots, n_d)$. A single edge $\theta_i \in E$ represents a single street if the street is a straight line and vertex $v_i \in V$ is the endpoint of a street. So, a straight street has two endpoints. If the street consists of one or more curves, it can be represented as multiple edges with their respective vertices.

In an SNC prototype, a mobile client performs some basic steps to reach destination:
1. Determine the destination.
2. Select a nearest vertex to reach to the destination.
3. Select an average speed for that street segment.
4. Pause at the end whenever required.
5. Once an end is reached, select the next vertex and initiate the next movement towards destination.
6. Repeat 2 to 5 until destination is reached.

This system addresses the tradeoff between network traffic and localisation performance in a mobile sensor network application. Location based wireless mobile tracking applications can tolerate a fixed uncertainty in client positions. Position uncertainties vary based on street end points. The outcome of this module identifies a connected system and its dynamicity, so helping the overall system to understand the current location of the connected system and helping to address the connected system requirements with support of the street network prototype and a distributed street network.

Street Network prototype extracts information from the street network. Street graph metadata can be sued to assemble a street matrix $S=[s_1, s_2, \ldots, s_n]^T$ (here, T means transpose of a matrix) with all n number of streets present in the city. A relatively sparse matrix C of dimensions n x n holds information about connections among streets. If $c_{ij} \in C$ holds a value 1 then this indicates that streets $s_i$ and $s_j$ are connected to each other.

There can be different types of streets in an environment, including highways, commercial streets, residential streets, small lanes etc., all of which may be more or less congested at any given time. The average speed of clients at each type of street differs from each other. So, streets are classified according to their maximum average speed. The matrix $T=[t_1, t_2, \ldots, t_m]^T$ having dimension of m×1, holds the types of streets. Streets and street segments are dynamically assigned with a specific type based upon maximum average speed. The type is not a fixed value but 'dynamically' assigned because a single street may experience different average speed at different period. For example a city street may be congested in the morning and evening but relatively free flowing during the afternoon and at night. These patterns can be learnt from historical data and maximum speed limits assigned to streets. Random events such as accidents and emergency situations can also change a traffic situation on a street. These can still be learnt after a certain period or from the pattern of average speed of previous clients. These random factors may be considered in adaptive location data transmission.

Each vertex of G is one of the endpoints of a street segment. Hence each vertex can be considered as a junction. The dimension d of each vertex depicts the number of streets that meet at that junction. Hence a matrix $D=[d_2, d_2, \ldots, d_r]^T$ may be generated for the dimensions of all vertices. If $d_i=2$, that vertex is the connecting point of the segments of a curved street. If $d_i>2$, then that can be a road crossing with traffic signal.

Each client's movement is characterized by non-overlapping time periods $T_1, T_2, \ldots, T_n$. During each period $T_i$, the client travels at a street i of length $L_i$ with some average speed $V_i$. For the generic case, it may be considered that values of Ls, Vs are mutually independent. Hence $T_i=L_i/V_i$ are also mutually independent. Here, the destination of a mobile client is not randomly selected but identified from the connected streets at the last street's endpoint with different probabilities.

The average speed for a client may be set to the maximum speed limit or according to the street type for the current street, summing with a Gaussian distributed value with a zero mean and a predefined standard deviation. It may be assumed that a client may change its speed if it reaches an intersection and the next street to travel is full, or if there is another client in front of it moving at a lesser speed (for example owing to traffic congestion) or if a traffic signal is present (uniform delay). On reaching an intersection, the client pauses for a finite time $t_p$ uniformly chosen from an interval [0, $t_{pmax}$] with some probability. This probability is linearly dependent on degree d of that street segment. As mentioned earlier, if $d_i=2$, that vertex is the connecting point of the segments of a curved street and probability of stopping at that vertex or significant reduction in client's speed should be low. If $d_i>2$, then that can be a road crossing with traffic signal. A higher value of d indicates a higher probability of pausing at that vertex with a finite stopping time.

Referring again to FIG. 4*b*, the step 430 of dividing the modelled environment into zones and distributing a zone of the modelled environment to a fog node within the zone may be implemented in a Distributed Street Network module.

Figure 7:
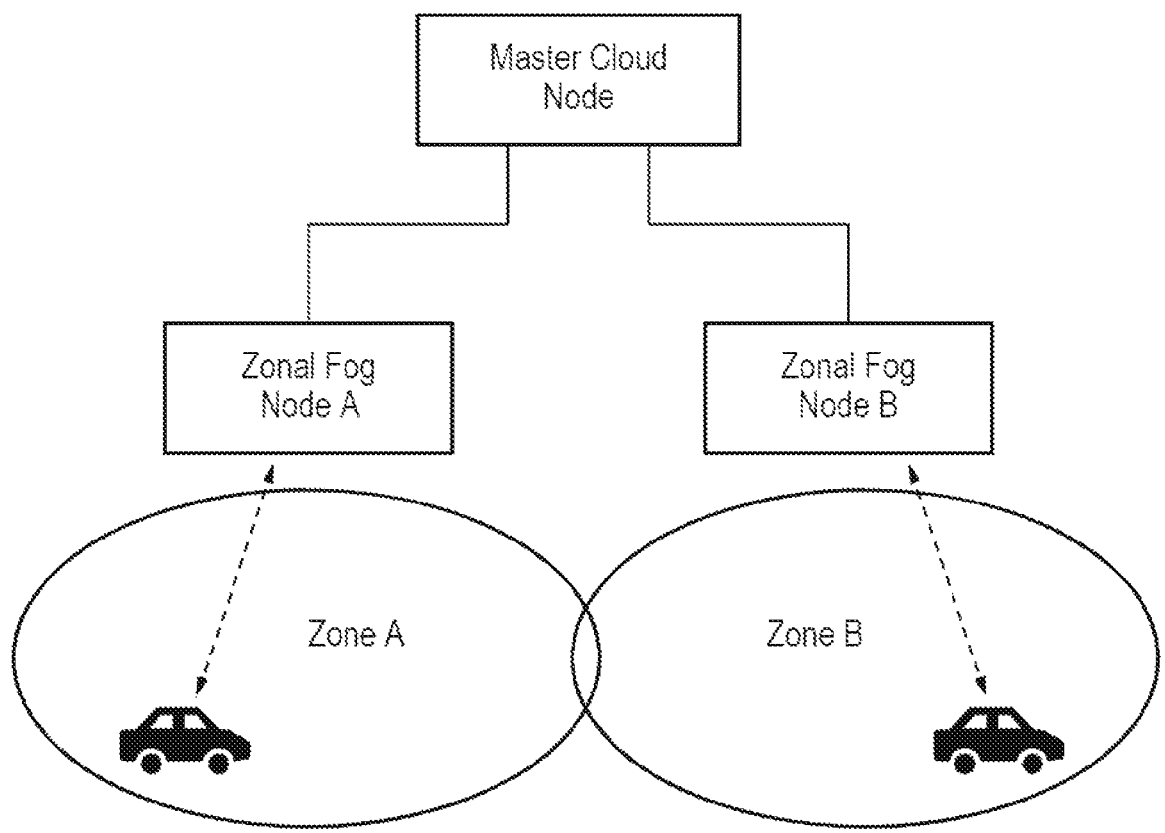
FIG. 7 illustrates distribution of zones of a street network to zonal fog nodes.

Apart from a centralized cloud storage, where Street matrices may be stored, a Street Network may be distributed for faster update and computation. The complete city street map may therefore be divided into multiple fog zones based upon street graphs clients, edges and average traffic volume. Each zone is controlled by zonal fog which contains a subset of the street map and handles location data and services for the clients roaming in that zone. The street graph's vertices and edges have a unique ID and names in the master street network at cloud level. The same IDs and names are used in zonal subsets to facilitate handshaking between zones. Benefits of having distributed map and location aggregation may be as follows: reduced latency, easy inclusion of new zones into the system on city expansion, communication among node hierarchy can apply blockchain or similar technology to ensure security. Distribution of zones to zonal fog nodes is illustrated in FIG. 7.

Communication between the fog nodes may follow any suitable communication protocol. In one example of the present disclosure, communication between fog nodes uses the Message Queueing Telemetry Transport (MQTT) protocol. MQTT is a light weight, open source publish/subscribe messaging transport protocol designed for power constrained devices and low-bandwidth, high-latency networks. MQTT is data agnostic and offers bandwidth efficiency and continuous session awareness, so helping to minimize resource requirements for IoT devices. MQTT also ensures reliability and assurance of delivery and is ideal for large networks of small devices that need to be monitored or controlled from a back-end server on the Internet. An MQTT module can establish effective communication between fog nodes to perform local actions to fulfill a request from a connected system.

The following process flow illustrates how the above discussed functional modules may cooperate to implement examples of the methods 300, 400.

1. Convert available street map data to street network graph G(V, E).
2. Learning Phase for Street Network Graph.
   Develop matrices—Street Matrix, Connectivity Matrix, Type Matrix, Dimension Matrix
3. Learning phase for trajectories of mobile nodes. The travel patterns of the nodes are learnt from data over a span of time (training phase). The training data are used to extract patterns from each client's travel history. Patterns include frequently followed trajectories (set of streets).
4. Once a client-side application running on a connected system issues a request for one or more services, the request traverses the fog to the cloud, where the unique id(s) for the requested service(s) are discovered from the hybrid graph. Corresponding fog nodes are notified.

The present disclosure proposed a new dynamic clustering methodology to group relevant fog nodes to perform the local actions required to fulfill the request of the connected system. The clustering method considers fog inherent characteristics including Low latency and location awareness, wide-spread geographical distribution, mobility, very large number of nodes in close proximity, predominant role of wireless access, strong presence of streaming and real-time applications, and heterogeneity.

5. Context aware Dynamic Clustering: Services requested by the client (connected system) and associated services are grouped together. This contextual discovery is performed on the basis of the allied score in the hybrid graph. Cloud side apparatus receives location data from connected clients and extracts the trajectory pattern using machine learning heuristics. Using the extracted patterns and recent data, it predicts the next location of the client. If the client is mobile, fog nodes providing the requested and associated services along its known trajectories are clustered dynamically.

Step 5.1: the clustering module operates at the rate of the data stream and creates clusters putting together data samples that are close, in the sense of Euclidian distance, at a spatiotemporal point.

Step 5.2: Whenever a new service request arrives, the algorithm searches for the closest cluster. Once found, a maximal distance criterion is evaluated to decide if the request fits inside the cluster.

Step 5.3: If the fitting is sufficient, the cluster is updated to account for the services to be provided in fulfilling the received request; if not, a new cluster is created with the service request information using its timestamp as cluster time of creation.

Step 5.4: This stage analyses the distribution of clusters. The density of a cluster is considered from current number of objects in it and is used to create the final clusters by a density-based fusion.

Step 5.5: A density measure is executed over the clusters, which allows the algorithm to find clusters of arbitrary shape. A cluster may be of three different types: dense cluster, semi-dense cluster and low-density cluster. The difference between each type is established based on dynamic thresholds found locally.

Step 5.6: A cluster is said to be connected to another cluster if there exists a chain of clusters between them such that each cluster in the chain may cooperate with an adjacent cluster in the chain. A set of connected clusters is referred to as a group.

Step 5.7: Groups of clusters are analyzed recursively. Once a cluster is created, the rest of the group is analyzed in turn.

Step 5.8: Once the clustering distribution is found, a copy of the clustering distribution is stored as a snapshot that may be examined in the future to extract more information about the system evolution. Snapshots are stored following a pyramidal time scheme that stacks past snapshots according to several sampling times.

Step 5.9: To maintain an up-to-date model, greater weight should be given to newly incoming data. In the proposed algorithm, clusters are weighted with a decay function dependent on the current time t and the last assignment time $t_k$. The function $\beta^{-\lambda(t-t_k)}$ may be used to emulate an ageing process over a damped window.

Step 5.10: This stage analyses the cluster density checking for changes. Clusters are evaluated to find out if their density is below a low-density threshold. If that is the case, the cluster is eliminated and no longer considered. Once filtered in this manner, the remaining active clusters are analyzed looking for groups. For each group the local density analysis is performed recursively to find all possible clusters.

Step 5.11: Locally, the proposed algorithm checks each cluster to determine whether its density has decreased below the semi-dense threshold. If this is the case, the cluster is eliminated and with its statistics a low-density cluster is created. This update may create new low-density regions inside a cluster, changing the form of a cluster and even causing it to split into two or more clusters, following data evolution.

Step 5.12: If inside a group some low-density clusters have grown into semi-dense clusters, two clusters that were separated may be combined using a fusion action.

6. Cache Prefetching: The information from this dynamic clustering may be used to facilitate prefetching the local fog cache that can be used to execute more quickly the local actions required by the connected system.

The above described process flow can adapt to the appearance of new clients or trajectories on the fly. For example, if a service request is received from a new client, context aware search may be performed to associate the request with existing, annotated services. If a client traverses in a new trajectory, the current fog may communicate with its neighborhood fog to generate the dynamic cluster and cache prefetching.

Figure 8:
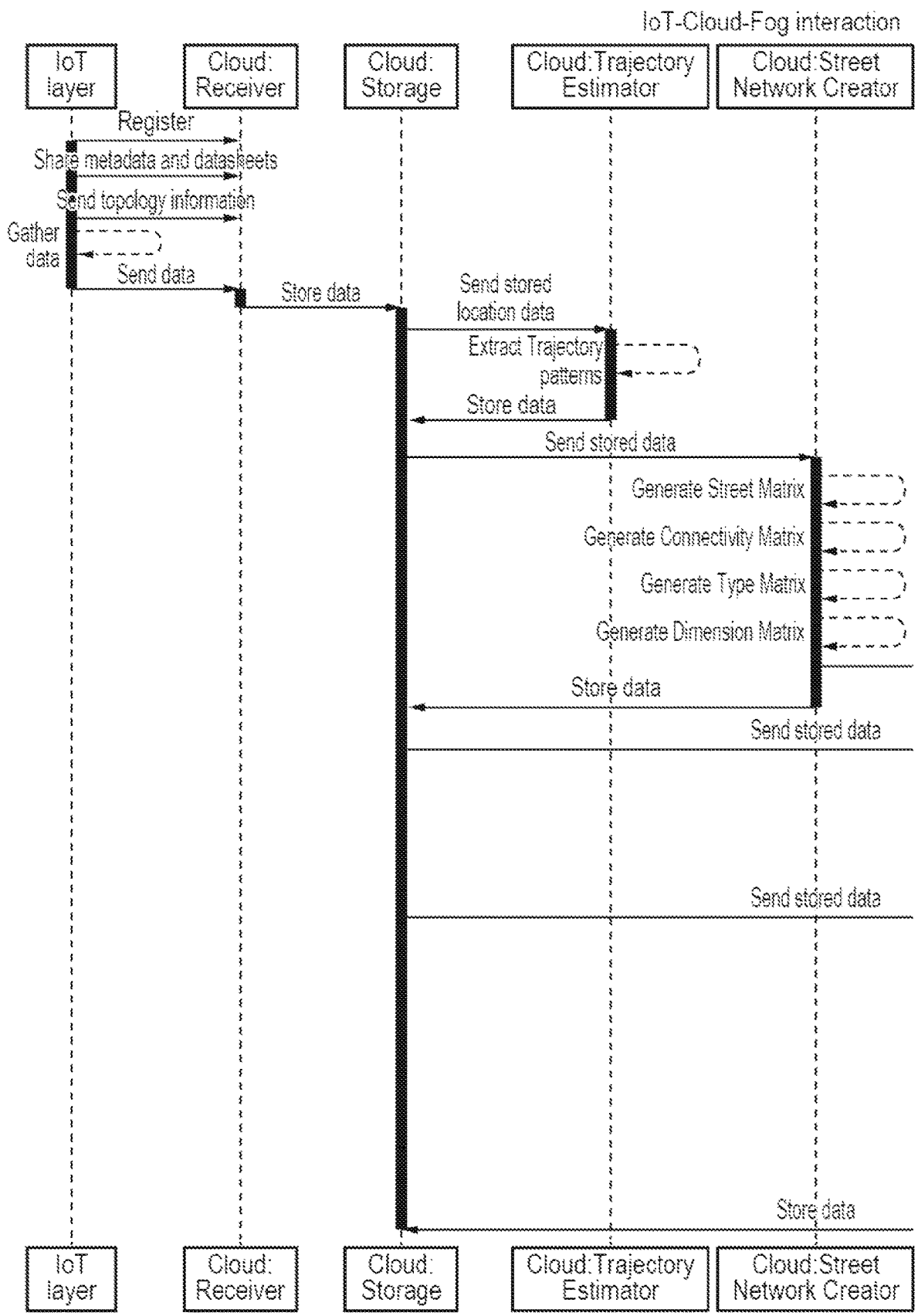
FIG. 8 is a message exchange diagram illustrating interaction between the fog and cloud layers of a deployment.
Figure 8:
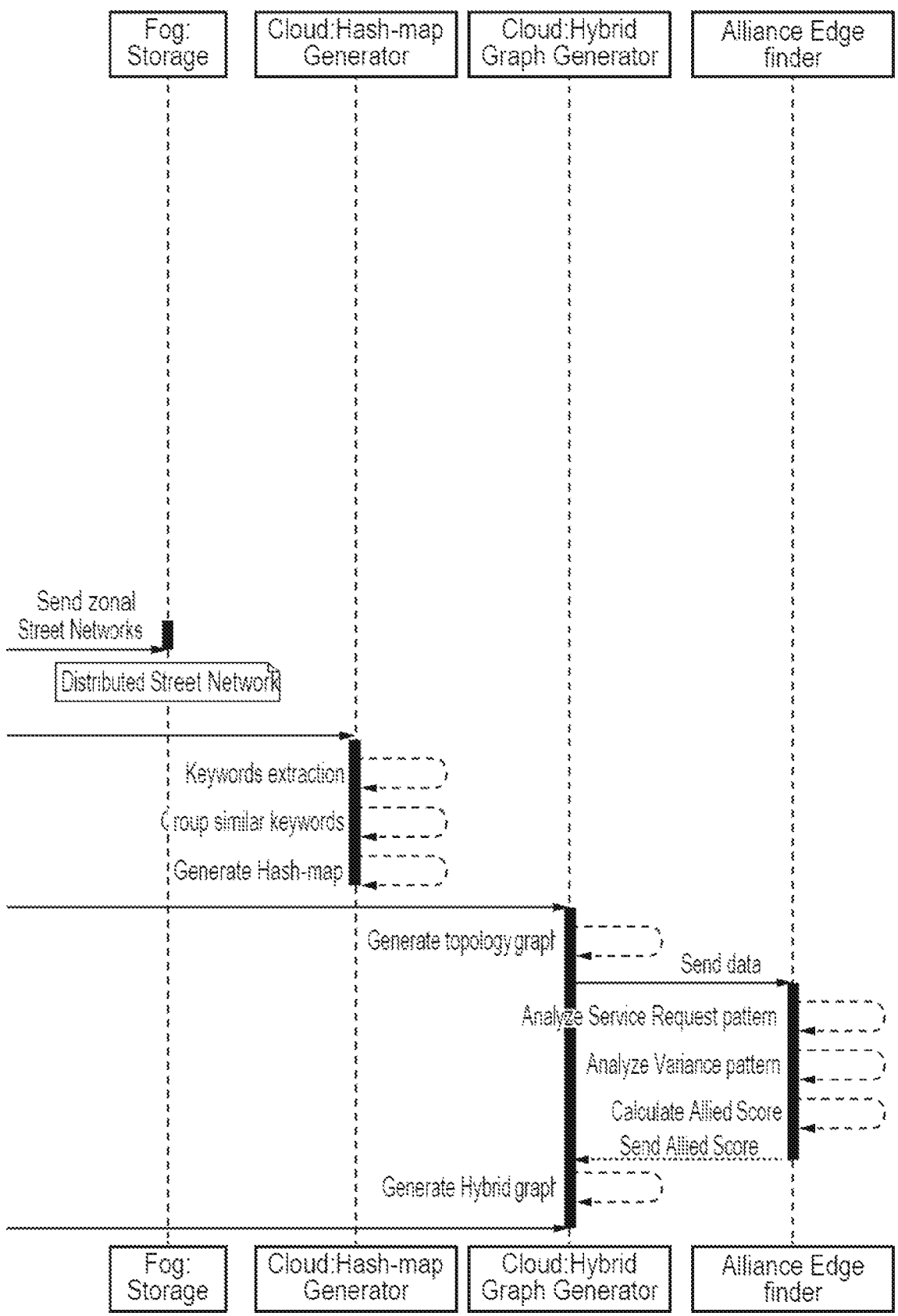

FIG. 8 is a message exchange diagram illustrating interaction between the fog and cloud layers of a deployment according to examples of the present disclosure. FIG. 8 illustrates message exchanges for the performing of steps 402 to 430 of the method 400, involving the registration of new fog nodes, location monitoring and trajectory extraction, environment modelling, hash map generation, alliance edge generation and generation of the hybrid graph of the fog nodes.

Figure 9:
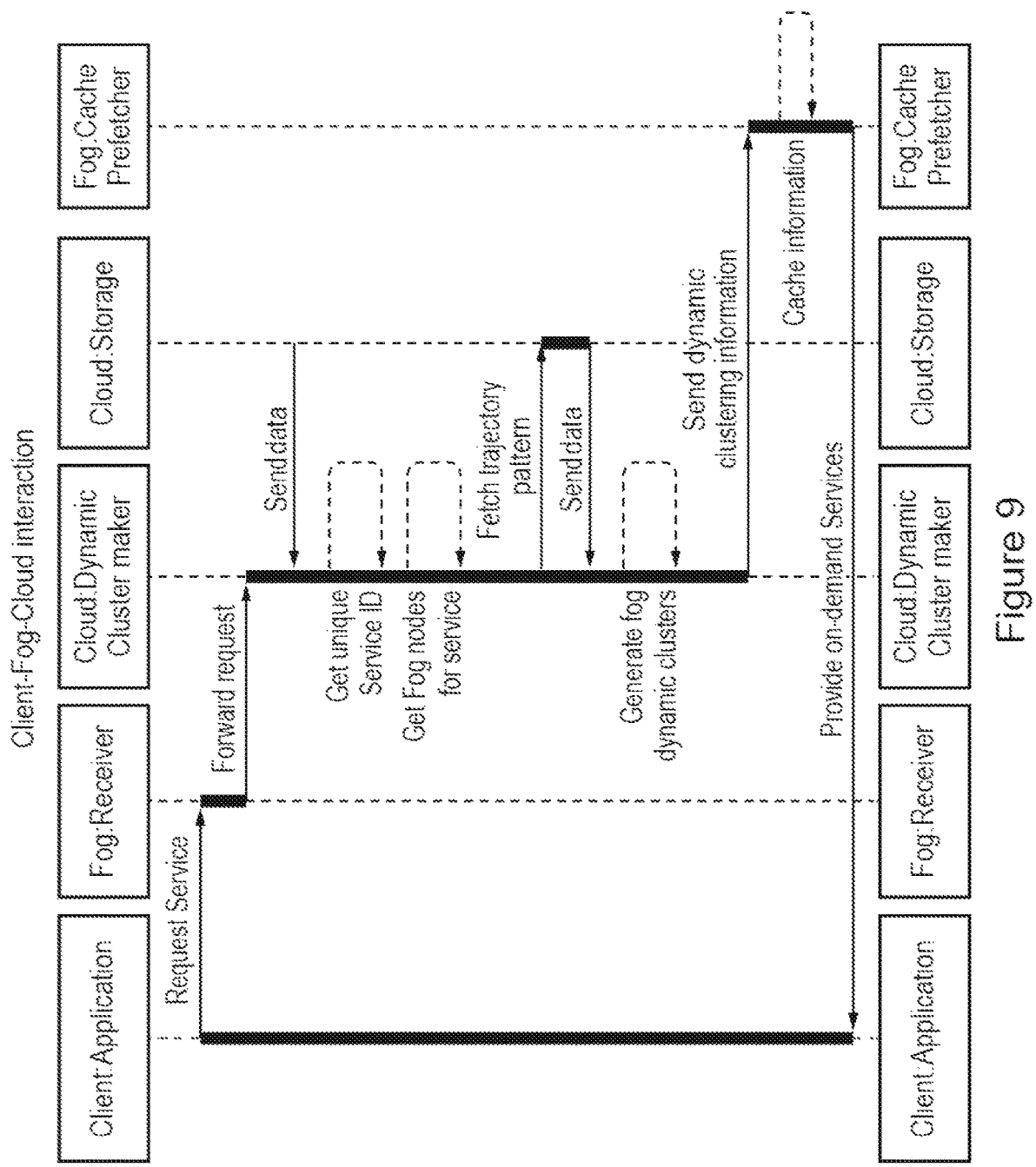
FIG. 9 is a message exchange diagram illustrating interaction between a client node and the fog and cloud layers of a deployment.

FIG. 9 is a message exchange diagram illustrating interaction between a client node and the fog and cloud layers of a deployment according to examples of the present disclosure. FIG. 9 illustrates message exchanges for the performing of steps 432 to 446 of the method 400, involving receiving a request form a client node, identifying fog nodes to provide primary and secondary services for the request, determining a location for fulfillment of the request, dynamic clustering, cache prefetching and provision by selected fog nodes of the requested services.

The following discussion considers in greater detail the step 440 of method 400, in which fog nodes are selected for allocation to a received request.

The optimization problem comprises a set of fog service providers and a set of clients. Fulfilling of a client request comprises two phases: service discovery and provision of the discovered services by the fog. The requested services are enriched with knowledge from associated services identified in service discovery and addressing localization issues. Two time-windows are assigned to each request: a service discovery time window that specifies when service discovery can be started, and a service delivery time window that indicates when the service can be delivered to the client. Service times or durations are also associated with each request and delivery. The service durations indicate how long it will take for the service delivery to be performed. Each request is assigned a set of feasible fog service providers within an identified cluster.

The optimization task is to optimally deliver the requested services to requesting clients. A task is valid if time windows and capacity constraints are obeyed along the route, and each request is served with the corresponding delivery times. The aim is to minimize the cost function described below.

As the number of fog service provider nodes is limited, situations may occur in which some requests cannot be assigned to a fog. These requests are placed in a virtual request bank.

The objective of the problem is to minimize a weighted sum comprising the following three components:
1) the number of clustered services explored across the client's trajectory (i.e. the number of cooperating clusters required to deliver the services along the client trajectory),
2) total time spent by clients and service providers to serve the request,
3) the total number of unfulfilled fog service requests.

The three terms are weighted by the coefficients $w_1$, $w_2$ and $w_3$ respectively. Normally a high value is assigned to $w_3$ to serve as many requests as possible.

There are n requests from clients and m fog service providers are present. The problem is defined on a city fog network graph where:

$R=\{1, \ldots, n\}$ is the set of mobile nodes raising requests (and hence the set of requests).

$D=\{1, \ldots m\}$ is the set of services delivery fog nodes.

K is the set of all service providers (which may include both fog service providers and cloud service providers). In the preset discussion, only fog service providers are considered, and hence $|K|=m$.

i is a request in the set R.

k is a provider in the set K (and hence in the present example, a fog node in the set D).

$K_i$ is the set of providers that can serve request i (as one provider might not be able to serve all requests).

$R_k \subseteq R$ set of requesting nodes (or requests) that can be served by fog node k.

$D_k \subseteq D$ is the set of delivery fog nodes that can be served by fog node k.

For all i and k: $k \in K_1 \Leftrightarrow i \in R_k \wedge i \in D_k$.

For each edge e in the movement graph G(V, E) a distance $d_{xy} > 0$ and travel time $t_{xy} > 0$ between client x and provider y is assigned.

Each provider has a service time $s_i$ and a time window $[a_i, b_i]$. The service time represents the time needed for providing services to a client and the time window indicates when the provider will be in a service delivery zone (zone of service delivery fog node). A visit to location i can take place between time $a_i$ and $b_i$. A client can arrive at a delivery node before the start of the time window but may need to wait for $\tau$ delay time.

Four types of decision variable are used in the mathematical model proposed below. $c_{xy}$ is a continuous variable for probability of meeting client x and provider y in the movement map within N hops. R is a non-negative integer representing minimum number of services present in a fog provider. T is a non-negative integer that indicates amount of time client takes to reach a provider for getting a service. Finally, d is a binary decision variable that indicates if a service request is successfully placed for the client. The mathematical model is:

$$\min w_1 \Sigma_{k \in K} \Sigma_{oe} d_{xy} + c_{xy} + w_2 \Sigma_{k \in K}(r_{keK} - o_k - \tau_k) + w_g \Sigma_{rez} d_r$$

The objective function minimizes the weighted sum of the available clustered services, the sum of the time spent to serve requests, and the number of requests not serviced. The above description has presented examples of methods in the context of a smart city paradigm. Example fog networking systems in such a paradigm may include Smart buildings, Smart transport, Connected Car, Smart Parking etc. The examples presented have demonstrated how different fog nodes from different fog system systems may be connected and their resources used to address problems such which building to park in by considering various aspects including traffic, available parking lot, building and floor, and other relevant features. Other sue cases for the proposed methods may also be envisaged, and some brief examples are presented below.

Smart healthcare and disaster management:

Real-time health monitoring and diagnostics are a crucial part of the healthcare industry. During emergency situations or disasters, it is necessary to transport patients from one location to another while providing continuous monitoring and remote diagnostics. Context aware fog resource allocation and task scheduling can provide uninterrupted and improved quality services for this purpose, as illustrated below:

Registration: Fog devices from all fog networks in a city (including smart home fog, traffic system fog, vehicle fogs, weather fog, blood bank fog, hospital fog etc.) first register in the cloud. The clients are assigned a unique registration key. There can be mobile as well as static clients in the system.

Trajectory estimator: This module learns the pattern of frequently followed trajectories by IoT clients. These patterns can be learnt from historical data and speed limits assigned for the environment.

Street Network Creator: Once the Trajectory Estimator has learned the mobility pattern of the clients, Street Network Creator module develops a street network model for easy tracking of mobility of the clients in the city street network.

Street Network is distributed into multiple fog zones based upon street graphs clients, edges and average traffic volume. Each zone is controlled by zonal fog containing a subset of street map and handles location data and services for the clients roaming in that zone.

Hash-map generator: A hash-map for all similar kinds of fog services in the city paradigm and their unique keys is generated from service metadata and datasheets of fog devices using a Service Matching Algorithm. Similar services are grouped together and assigned with unique keys.

Alliance Edge Finder: The Alliance edge finder module generates alliance edges by service request pattern analysis and variance pattern analysis. Alliance edges are provided to the Hybrid Graph Generator.

Hybrid Graph generator: This module generates and stores the fog network hierarchy graph with their three types of edges. This module runs the Neighborhood_Selection algorithm to group fog nodes into matched neighborhoods.

During the emergency, patients need to be moved efficiently from one place to another. As a service request is initiated from a smart Ambulance, associated services are discovered and grouped together.

The request first obtains a unique service ID. The clustering module fetches the information of the fog nodes capable of serving the requested service.

The Clustering module receives location data from connected clients and extracts the trajectory pattern using machine learning heuristics. Using the extracted patterns and recent data, it predicts the location of the client.

Fog nodes providing the necessary services along the client's known trajectories are clustered dynamically.

Contextual discovery is performed from allied score in Hybrid Graph to discover associated services from different fog networks. For example: the ambulance may need to obtain the fastest route to reach a hospital. In this case, a collaboration with traffic system fog and weather fog is required as these fog nodes have a high allied score in the Hybrid Graph.

The Traffic system fog provides information regarding current traffic conditions, street conditions, directions, number of vehicles moving in the same direction etc. The Weather fog provides information about the weather (rain, snow fall etc.). The ambulance decides an optimal trajectory based on the weather and traffic information received.

Once the intended trajectory of the ambulance is decided, the information can be provided back to the traffic system fog. The Traffic fog initiates alert notifications to inform other vehicles to give a way to the ambulance.

If a request is raised from the ambulance, hospital fog systems can collaborate to discover the best choice of nearby hospital at which required treatments and beds are available. Remote monitoring and diagnostics can be made accordingly. The Vehicle fog collaborates with a blood bank fog to discover the availability of blood of specific groups.

The above use case discussion illustrates another example of how dynamic fog resource allocation and task scheduling based on context discovered from the Hybrid Graph may be performed. The transporting of a critical patient by ambulance to a suitable hospital over the fastest possible route is performed through collaboration among local fog systems. Relevant fog systems are grouped together and placed for immediate information sharing. The adaptive fog system learns the context, places the relevant resources and schedules the tasks accordingly for performing the local actions required to fulfill a request.

Intelligent manufacturing and maintenance:

Application of IoT in the manufacturing industry is now widespread. Owing to the very complex processes and inherent fluctuations associated with manufacturing, companies are continually seeking to improve their yield rate to reduce costs and increase profit margins. Predictive maintenance prevents unnecessary repairs, maximizes effective asset lifetime, and significantly reduces major failures and downtime. This results in cost savings with an increased return on investment and customer satisfaction. Predictive maintenance has become a key part of the maintenance in manufacturing. Industries are deploying such processes to maximize the reliability of their equipment by detecting potential failures before significant problems arise. Context aware collaboration among fogs, including for example a production fog, maintenance fog, quality assurance fog, waste management fog, transport fog, traffic system fog etc. may help to run complex manufacturing processes smoothly. In addition, localisation problems including failure detection, downtime prediction, maintenance planning, cost-effective logistics and supply chain planning can be addressed efficiently.

Intelligent mining:

IoT with Fog computing can be used to help increase mining production significantly by tracking miners and vehicles at remote locations and monitoring the status of vehicles using real-time data and analytics. Mining vehicles are equipped with embedded sensors that enable safety and route optimization based on real-time vehicle and terrain data. Asset monitoring information can be collected over time to help in predictive maintenance for critical machines and other assets. Mine workers can also be connected, with health monitoring devices allowing for real-time evaluation of physical condition and fatigue and sending alerts in case of incidents or accidents. Different fog systems in the mining industry, including vehicle fog, traffic system fog, weather fog, mining instrument fogs, maintenance system fog, health-record fog etc. can collaborate to address the localisation problems. This context aware collaboration can help mining companies to run mining operations smoothly while ensuring safety measures for workers and having efficient logistic management.

Aspects and examples of the present disclosure thus provide methods of allocating resources of fog nodes that allow for the efficient fulfilling of client requests. Fog systems pose several challenges in terms of system management; services are divided into multiple micro-level services and distributed across edge devices and the cloud. Proper management of fog architecture to execute microservices is an important challenge in the fog computing domain. Service placement and service combination are two significant difficulties faced in large scale, micro service management architecture.

The present disclosure proposes scalable systems and methods that cluster the micro services attached to fog nodes dynamically based on relationships. Services provided to end users are grouped according to context aware fog resource allocation and task scheduling in the fog network. Examples of the present disclosure automatically aggregate fog nodes with knowledge from different, existing fog networks. The aggregated clusters are used to perform the local actions required to fulfill service requests received from connected systems promptly and efficiently. Examples of the present disclosure thus offer improved precision in task allocation, resource scheduling and decision making, as well as improved cooperation between fog nodes, which may be exploited in a wide range of use cases, including vehicle movement, drone flight etc.

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form.

It should be noted that the above-mentioned examples illustrate rather than limit the disclosure, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfill the functions of several units recited in the claims. Any reference signs in the claims shall not be construed so as to limit their scope.

The invention claimed is:

1. A method for allocating resources of fog nodes, wherein the fog nodes are organized into at least one fog network, the method comprising:
   receiving a request from a client node;
   identifying requirements for fulfillment of the request;
   determining a location of the client node for fulfillment of the request, comprising estimating a trajectory of the client node on the basis of historical location data for the client node within an environment;
   identifying, from the identified requirements and the determined location of the client node, a cluster of fog nodes operable to fulfill the request;
   selecting, from the identified cluster, fog nodes the resources of which are to be allocated to fulfill the request by minimizing at least one of:
      a number of clusters required to fulfill the request; and
      a number of unfulfilled requests received by the fog nodes; and
   registering a new fog node;

associating a service provided by the fog node with corresponding services provided by other fog nodes; and assigning a key to associated services and generating a hash map that maps assigned keys to associated services provided by fog nodes.

2. The method as claimed in claim 1, wherein identifying requirements for fulfillment of the request comprises:

identifying a primary service for the request, wherein the primary service comprises a service provided by at least one fog node which service is necessary to fulfill the request; and identifying fog nodes operable to provide the primary service for the request.

3. The method as claimed in claim 2, wherein identifying requirements for fulfillment of the request further comprises:

identifying fog nodes operable to provide a secondary service for the request, wherein a secondary service comprises a service provided by at least one fog node which service is associated with a primary service for the request.

4. The method as claimed in claim 3, wherein identifying fog nodes operable to provide a secondary service for the request comprises:

identifying fog nodes comprised within a same matched neighborhood as an identified fog node operable to provide a primary service for the request;

wherein a matched neighborhood comprises a plurality of fog nodes correlated according to at least one of:
a service request pattern for the services they provide;
a trend variance pattern for the services they provide.

5. The method as claimed in claim 1, wherein determining a location of the client node for fulfillment of the request comprises:

modelling the environment as a location graph comprising vertices representing waypoints within the environment and edges representing legitimate paths between the waypoints.

6. The method as claimed in claim 1, wherein identifying, from the identified requirements and the determined location, a cluster of fog nodes operable to fulfill the request comprises:

generating at least one cluster comprising fog nodes that are:
operable to at least partially fulfill the request;
within a threshold distance of each other at a particular point in time; and
operable to cooperate with one another.

7. The method as claimed in claim 6, wherein identifying, from the identified requirements and the determined location, a cluster of fog nodes operable to fulfill the request further comprises:

identifying a generated cluster that is within a threshold distance of the client node; and determining, on the basis of the determined location and a time period for fulfillment of the request, whether the request can be fulfilled by the identified generated cluster.

8. The method as claimed in claim 6, wherein identifying, from the identified requirements and the determined location, a cluster of fog nodes operable to fulfill the request further comprises:

establishing groups of clusters, wherein a group of clusters comprises a plurality of clusters operable to cooperate, such that they form a chain of service provision.

9. The method as claimed in claim 6, wherein identifying, from the identified requirements and the determined location, a cluster of fog nodes operable to fulfill the request further comprises:

executing a density measure over the clusters; and
eliminating clusters falling below a density threshold.

10. The method as claimed in claim 1, wherein selecting, from the identified cluster, fog nodes the resources of which are to be allocated to fulfilling the request comprises calculating an objective function minimizing a weighted sum of terms representing at least one of:

a number of clusters required to fulfill the request;
a total time to fulfill requests received by the fog nodes;
a number of unfulfilled requests received by the fog nodes.

11. The method as claimed in claim 1, wherein associating a service provided by the fog node with corresponding services provided by other fog nodes comprises:

extracting information about the service from service metadata;

calculating a measure of similarity between the extracted information and information extracted from metadata for services provided by other fog nodes;

associating the service with a service provided by other fog nodes with which the service has a highest similarity score.

12. The method as claimed in claim 1, further comprising:

generating a graph of registered fog nodes in which vertices represent fog nodes and in which vertices are connected by at least one of:

a location edge representing a physical topological connection between fog nodes;

a service edge connecting fog nodes providing the same services;

a service alliance edge connecting fog nodes providing services that are correlated.

13. The method as claimed in claim 12, further comprising:

detecting a service request pattern between services provided by fog nodes;

detecting a trend variance pattern between services provided by fog nodes; and generating service alliance edges in the graph of registered fog nodes on the basis of the detected service request patterns and trend variance patterns.

14. The method as claimed in claim 1, further comprising:

registering a new client node;
monitoring a location of the registered client node; and
learning from the monitored location at least one trajectory within an environment that is associated with the registered client node.

15. A controller for allocating resources of fog nodes, wherein the fog nodes are organized into at least one fog network, the controller comprising a processor and a memory, the memory containing instructions executable by the processor such that the controller is operable to perform operations comprising:

receiving a request from a client node;
identifying requirements for fulfillment of the request;
determining a location of the client node for fulfillment of the request, comprising estimating a trajectory of the client node on the basis of historical location data for the client node within an environment;

identifying, from the identified requirements and the determined location of the client node, a cluster of fog nodes operable to fulfill the request;

selecting, from the identified cluster, fog nodes the resources of which are to be allocated to fulfill the request by minimizing at least one of:
    a number of clusters required to fulfill the request; and
    a number of unfulfilled requests received by the fog nodes; and
registering a new fog node;
associating a service provided by the fog node with corresponding services provided by other fog nodes; and
assigning a key to associated services and generating a hash map that maps assigned keys to associated services provided by fog nodes.

* * * * *